(12) United States Patent
May et al.

(10) Patent No.: US 9,885,478 B1
(45) Date of Patent: Feb. 6, 2018

(54) PROCESS FOR GENERATING COMBUSTIBLE GAS FROM ORGANIC FEEDSTOCK AND REACTORS THEREFOR

(75) Inventors: David F. May, Prestonsburg, KY (US); John Burke, Jr., Prestonsburg, KY (US); David F. May, II, Allen, KY (US); Paul E. Aiken, Prestonsburg, KY (US)

(73) Assignee: Recycling Solutions Technology, LLC, Prestonburg, KY (US)

( * ) Notice: Subject to any disclaimer, the term of this patent is extended or adjusted under 35 U.S.C. 154(b) by 904 days.

(21) Appl. No.: 13/405,438

(22) Filed: Feb. 27, 2012

Related U.S. Application Data

(60) Provisional application No. 61/447,461, filed on Feb. 28, 2011.

(51) Int. Cl.
*F23G 5/20* (2006.01)
*F23G 5/027* (2006.01)
*F23B 30/04* (2006.01)
*F27B 7/00* (2006.01)

(52) U.S. Cl.
CPC ............... *F23G 5/20* (2013.01); *F23B 30/04* (2013.01); *F23G 5/027* (2013.01); *F27B 7/00* (2013.01); *F23G 2201/30* (2013.01); *F23H 2700/004* (2013.01)

(58) Field of Classification Search
USPC .......................... 110/226, 229, 230, 246, 276
See application file for complete search history.

(56) References Cited

U.S. PATENT DOCUMENTS

| | | | |
|---|---|---|---|
| 3,680,500 A | 8/1972 | Pryor | |
| 3,734,037 A | 5/1973 | Martin | |
| 3,794,565 A * | 2/1974 | Bielski et al. ................ | 110/254 |
| 3,838,015 A * | 9/1974 | Buchbinder et al. ......... | 110/246 |
| 4,520,738 A | 6/1985 | Takehara | |
| 4,941,415 A | 7/1990 | Pope et al. | |
| 4,976,206 A | 12/1990 | Steiner et al. | |
| 5,018,457 A | 5/1991 | Brady et al. | |
| 5,134,944 A | 8/1992 | Keller et al. | |
| 5,230,211 A | 7/1993 | McMahon et al. | |
| 5,245,114 A | 9/1993 | Forrester | |
| 5,288,195 A | 2/1994 | McIntyre | |
| 5,315,938 A | 5/1994 | Freller | |
| 5,331,746 A | 7/1994 | Martin et al. | |
| 5,401,481 A | 3/1995 | Rochelle et al. | |
| 5,410,973 A * | 5/1995 | Kunstler et al. ............. | 110/246 |
| 5,425,850 A * | 6/1995 | Tanca et al. .................. | 110/238 |
| 5,560,304 A * | 10/1996 | Duchateau et al. ......... | 110/346 |
| 5,566,626 A * | 10/1996 | Schaefer et al. ............. | 110/246 |
| 5,711,233 A | 1/1998 | Martin et al. | |
| 5,823,122 A | 10/1998 | Chronowski et al. | |

(Continued)

*Primary Examiner* — David J Laux
(74) *Attorney, Agent, or Firm* — Honigman Miller Schwartz and Cohn LLP; Andrew N. Weber; Jonathan P. O'Brien

(57) ABSTRACT

The present invention provides a method of generating combustible gas from organic feedstock, such as the organic components of municipal waste, and a reactor therefor. The feedstock is processed through a plurality of reaction zones within the reactor, wherein the environment of each of the zones facilitates physical or chemical reactions that work to transform the organic feedstock into one or more combustible gases that can be burned for energy production.

20 Claims, 13 Drawing Sheets

(56) References Cited

U.S. PATENT DOCUMENTS

| | | |
|---|---|---|
| 5,988,080 A | 11/1999 | Miyoshi et al. |
| 6,032,467 A | 3/2000 | Oshita et al. |
| 6,038,988 A * | 3/2000 | Merz et al. .................. 110/346 |
| 6,116,169 A | 9/2000 | Miyoshi et al. |
| 6,149,765 A | 11/2000 | Mansour et al. |
| 6,932,002 B2 | 8/2005 | May et al. |
| 2007/0131150 A1* | 6/2007 | Yamazaki ..................... 110/229 |

* cited by examiner

PROCESS FOR GENERATING COMBUSTIBLE GAS FROM ORGANIC FEEDSTOCK AND REACTORS THEREFOR

CROSS REFERENCE TO RELATED APPLICATION

This application claims the benefit of U.S. Provisional Application No. 61/447,461, filed Feb. 28, 2011, which is hereby incorporated by reference in its entirety.

FIELD OF THE INVENTION

The present invention relates to methods and reactors for generating synthesis gas products from organic feedstock, which are useful for producing heat, steam, or electricity.

BACKGROUND OF THE INVENTION

Common energy sources include nuclear fuel, fossil fuel, solar rays, and wind. Use of each of these energy sources presents well-known drawbacks. For example, the conversion of nuclear fuel to energy requires sophisticated technology and rare raw materials. Fossil fuels, while more accessible than nuclear fuels, present environmental risks associated with drilling, extraction, and spillage. Wind and solar power are weather-dependent and highly-resource demanding for their return in usable energy. As the human population increases, the demand for energy likewise increases as well as energy costs. Consequently, a need exists for new, inexpensive, and reasonably accessible energy sources.

The present invention solves one or more of these problems.

SUMMARY OF THE INVENTION

The present invention provides a substantially self-sustaining method of generating combustible gas from organic feedstock, such as the organic components of municipal waste, and a reactor therefor. The feedstock (e.g., municipal waste) is processed through a plurality of reaction zones within the reactor, wherein the environment of each of the zones facilitates physical or chemical reactions that work to transform the organic feedstock into one or more combustible gases that can be burned to generate heat, steam, or electrical energy.

One aspect of the present invention provides a reactor for generating combustible gas (e.g., syn gas) from organic waste comprising a reactor chamber comprising a housing comprising a proximal end and a distal end, wherein at least a portion of an interior surface of the housing is substantially circular when viewed in cross-section, and a central axis extending from the proximal end to the distal end; a refractory lining that is disposed over at least a portion of the interior surface of the housing, wherein the refractory lining comprises one or more lifters extending outward from the interior surface of the housing; a gas inlet that fluidly communicates with a portion of the housing distal from the proximal end of the housing; a gas outlet that fluidly communicates with a portion of the housing proximal from the distal end of the housing and the gas inlet; a pump that fluidly communicates with the gas outlet; a valve that fluidly communicates with the gas inlet; and a rotator that rotates the housing around the central axis.

In some embodiments, the refractory lining comprises a plurality of lifters, wherein at least two of the lifters comprise different lengths, as measured from the interior surface of the housing to the tip of the lifter that extends into the reactor chamber.

In some embodiments, the refractory lining comprises a first plurality of lifters comprising a length, $L^1$, that are situated on the interior surface of the refractory lining at a location proximal to the distal end of the housing. In some examples, each of the lifters of the first plurality of lifters comprises a leading edge in the direction of rotation, wherein at least a portion of the leading edge comprises a downward-facing surface.

In some embodiments, the refractory lining comprises a second plurality of lifters comprising a length, $L^2$, that are situated on the interior surface of the refractory lining at a location distal to the first plurality of lifters. In some examples, each of the lifters of the second plurality of lifters comprises a leading edge in the direction of rotation, wherein at least a portion of the leading edge comprises a downward-facing surface. And, in some examples, the length of the second plurality of lifters, $L^2$, is less than the length of first plurality of lifters, $L^1$.

In some embodiments, the refractory lining comprises a third plurality of lifters comprising a length, $L^3$, that are situated on the interior surface of the refractory lining at a location distal to the second plurality of lifters. In some examples, each lifter of the third plurality of lifters comprises a leading edge in the direction of rotation, wherein at least a portion of the leading edge comprises a downward-facing surface. And, in some examples, the length of the third plurality of lifters, $L^3$, is less than the length of second plurality of lifters, $L^2$.

In some embodiments, the reactor further comprises an elevator that can reversibly elevate the proximal end of the housing so that the central axis of the housing can form angles, $\theta$ and $\theta'$ with a horizontal axis.

In other embodiments, the reactor further comprises an elevator that can reversibly lower the distal end of the housing so that the central axis of the housing can form angles, $\theta$ and $\theta'$, with a horizontal axis.

In some of these embodiments, the smaller of angles $\theta$ and $\theta'$ is 80° or less (e.g., 70° or less, 60° or less, 50° or less, 40° or less, 30° or less, or 15° or less).

In some embodiments, the housing comprises a thermally conductive material. For example, the housing comprises steel.

In some embodiments, the refractory lining comprises a thermally conductive material. For example, the refractory lining comprises ceramic or a fire brick material.

In other embodiments, the reactor further comprises a combustion chamber that fluidly communicates with the pump and the gas outlet. And, in some examples, the combustion chamber comprises a furnace.

In some embodiments, the reactor further comprises a heat exchanger that thermally communicates with the furnace. In some examples, the heat exchanger comprises a boiler.

And, in some embodiments, the reactor further comprises an electric turbine generator that fluidly communicates with the boiler.

In some embodiments, the housing comprises a length of about 300 feet or less (e.g., from about 15 ft to about 295 ft, from about 20 ft to about 250 ft, or from about 40 ft to about 225 ft).

In other embodiments, the inner surface of the housing comprises a diameter of about 20 feet or less (e.g., from about 2 ft to about 18 ft, from about 4 ft to about 15 ft, or from about 5 ft to about 10 ft).

Another aspect of the present invention provides a reactor for generating combustible gas from organic feedstock comprising a rotatable reactor chamber comprising a dehydration zone comprising a gas outlet, a feedstock inlet, and a first refractory lining disposed over at least a portion of an interior surface of the dehydration zone, wherein the first refractory lining comprises a first plurality of lifters that extend from the interior surface of the dehydration zone; a gasification zone comprising a second refractory lining disposed over at least a portion of an interior surface of the gasification zone; an oxidation zone comprising a third refractory lining disposed over a portion of an interior surface of the oxidation zone; and a cooling zone comprising a gas inlet that fluidly communicates with a valve; and a pump that fluidly communicates with the gas outlet, wherein the dehydration zone fluidly communicates with the gasification zone, the gasification zone fluidly communicates with the oxidation zone, and the oxidation zone fluidly communicates with the cooling zone; the reactor chamber is substantially airtight when the gas outlet, the feedstock inlet, and gas inlet are closed; and the pump and the valve cooperatively operate to regulate the pressure or gas flow inside the reactor chamber.

In some embodiments, the second refractory lining comprises a second plurality of lifters that extend from the interior surface of the gasification zone.

In some embodiments, the third refractory lining comprises a third plurality of lifters that extend from the interior surface of the oxidation zone.

And, in some embodiments, the cooling zone further comprises a fourth refractory lining disposed over at least a portion of interior surface of the cooling zone. In some examples, the cooling zone further comprises a waste outlet. In other examples, at least a portion of the cooling zone comprises a substantially circular interior surface when viewed in cross-section.

In some embodiments, at least a portion of the dehydration zone comprises a substantially circular interior surface when viewed in cross-section.

In some embodiments, at least a portion of the gasification zone comprises a substantially circular interior surface when viewed in cross-section.

In some embodiments, at least a portion of the oxidation zone comprises a substantially circular interior surface when viewed in cross-section.

In some embodiments, the first plurality of lifters each comprise about the same length.

In some embodiments, the second plurality of lifters each comprise about the same length.

In some embodiments, the third plurality of lifters each comprise about the same length.

In some embodiments, the lengths of the first plurality of lifters are greater than or equal to the lengths of the second plurality of lifters.

In other embodiments, the lengths of the second plurality of lifters are greater than or equal to the lengths of the third plurality of lifters.

In some embodiments, the reactor further comprises an elevator that can elevate or lower a portion of the reactor chamber so that the dehydration zone is elevated with respect to the gasification zone, the gasification zone is elevated with respect to the oxidation zone, and the oxidation zone is elevated with respect to the cooling zone.

In some embodiments, the reactor further comprises a first airlock that fluidly communicates with the feedstock inlet on the dehydration zone.

In some embodiments, the reactor further comprises a second airlock that fluidly communicates with the waste outlet on the cooling zone.

In some embodiments, the pump operates to generate negative pressure inside the reactor chamber when the gas inlet is at least partially closed.

And, in some embodiments, the reactor further comprises a furnace that fluidly communicates with the pump.

In some embodiments, the reactor further comprises a heat exchanger that thermally communicates with the furnace. In some examples, the heat exchanger comprises a boiler.

In some embodiments, the reactor further comprises an electricity-producing generator (e.g., a turbine generator) that fluidly communicates with the heat exchanger.

Another aspect of the present invention provides a method of generating heat or electricity from a feedstock comprising an organic component comprising loading the feedstock into a dehydration zone of a rotatable reactor; dehydrating at least a portion of the feedstock comprising concurrently tumbling and heating the feedstock to a temperature of at least about 200° F. in a negative-pressure low-oxygen environment to generate a substantially dehydrated feedstock and water vapor; migrating the dehydrated feedstock into a gasification zone of the reactor; gasifying at least a portion of the dehydrated feedstock comprising concurrently tumbling and heating the dehydrated feedstock to a temperature above about 350° F. in a negative-pressure low-oxygen environment to generate one or more gases and a mixture comprising a carbon residue and a waste material; migrating the carbon residue and the waste material into an oxidation zone of the reactor; oxidizing at least a portion of the carbon residue comprising tumbling and heating the carbon residue to a temperature above about 675° F. in a negative-pressure environment comprising about 12% to about 20% oxygen by volume to generate one or more gases; migrating the waste material into a cooling zone of the reactor, wherein heat from the waste material is transferred to the reactor; and aspirating at least a portion of the gas generated in the reactor to a combustion chamber.

In some implementations, the method further comprises combusting the gas inside the combustion chamber to generate heat.

In some implementations, the combustion chamber is situated outside the reactor chamber.

In some implementations, the tumbling and heating of the dehydrating step comprises rotating an internal surface of the dehydration zone substantially circumferentially around a central longitudinal axis that extends throughout the dehydration zone, wherein the internal surface comprises a heated refractory lining that is disposed over at least a portion of the interior surface of the dehydration zone and the refractory lining comprises one or more first lifters that tumbles the feedstock when the reactor is rotated.

In some implementations, the tumbling and heating of the gasifying step comprises rotating an internal surface of the gasification zone substantially circumferentially about a central longitudinal axis that extends throughout the gasification zone, wherein the internal surface comprises a heated refractory lining that is disposed over at least a portion of the interior surface of the gasification zone and the refractory lining comprises one or more first lifters, one or more second lifters, or a combination thereof, that tumbles the feedstock when the reactor is rotated.

In some implementations, the tumbling and heating of the oxidation step comprises rotating an internal surface of the oxidation zone substantially circumferentially about a central longitudinal axis that extends throughout the oxidation zone, wherein the internal surface comprises a heated refractory lining that is disposed over at least a portion of the interior surface of the oxidation zone and the refractory lining comprises one or more second lifters, one or more third lifters, or a combination of thereof, that tumbles the feedstock when the reactor is rotated.

In other implementations, the low-oxygen environment of the dehydration zone comprises less than about 5% oxygen by volume.

In some implementations, the low-oxygen environment of the gasification zone comprises less than about 7% oxygen by volume.

And, in some implementations, the aspiration of the combustible gas is performed by a pump that fluidly communicates with the dehydration zone of the reactor.

In some implementations, the method further comprises generating a current of gas that travels inside the reactor from the cooling zone to the dehydration zone, wherein the current of gas is generated by a pump that fluidly communicates with the dehydration zone of the reactor and generates negative pressure inside the reactor. For example, the pump operates cooperatively with a valve that communicates fluidly with the gas inlet in the cooling zone of the reactor to control and/or tune the flow of the current of gas and to control the pressure inside the reactor.

In some implementations, the feedstock comprises household waste, commercial waste, biological waste, or any combination thereof.

And, in some implementations, the method further comprises removing material from the feedstock that comprises metals, glass, materials having a high water content, or any combination thereof. In some examples, the removing step is performed prior to the processing of the feedstock in the reactor.

In some implementations, the method further comprises expelling the waste material from the cooling zone of the reactor through a waste outlet located in the cooling zone. In some examples, the waste outlet fluidly communicates with a first airlock.

In some implementations, the feedstock is loaded into the dehydration zone of the reactor through a feedstock inlet in the dehydration zone. And, in some examples, the feedstock inlet fluidly communicates with a second airlock.

In some implementations, the pump comprises a draft fan.

And, in alternative implementations, the valve comprises a ball valve or a butterfly damper.

Figure 1:
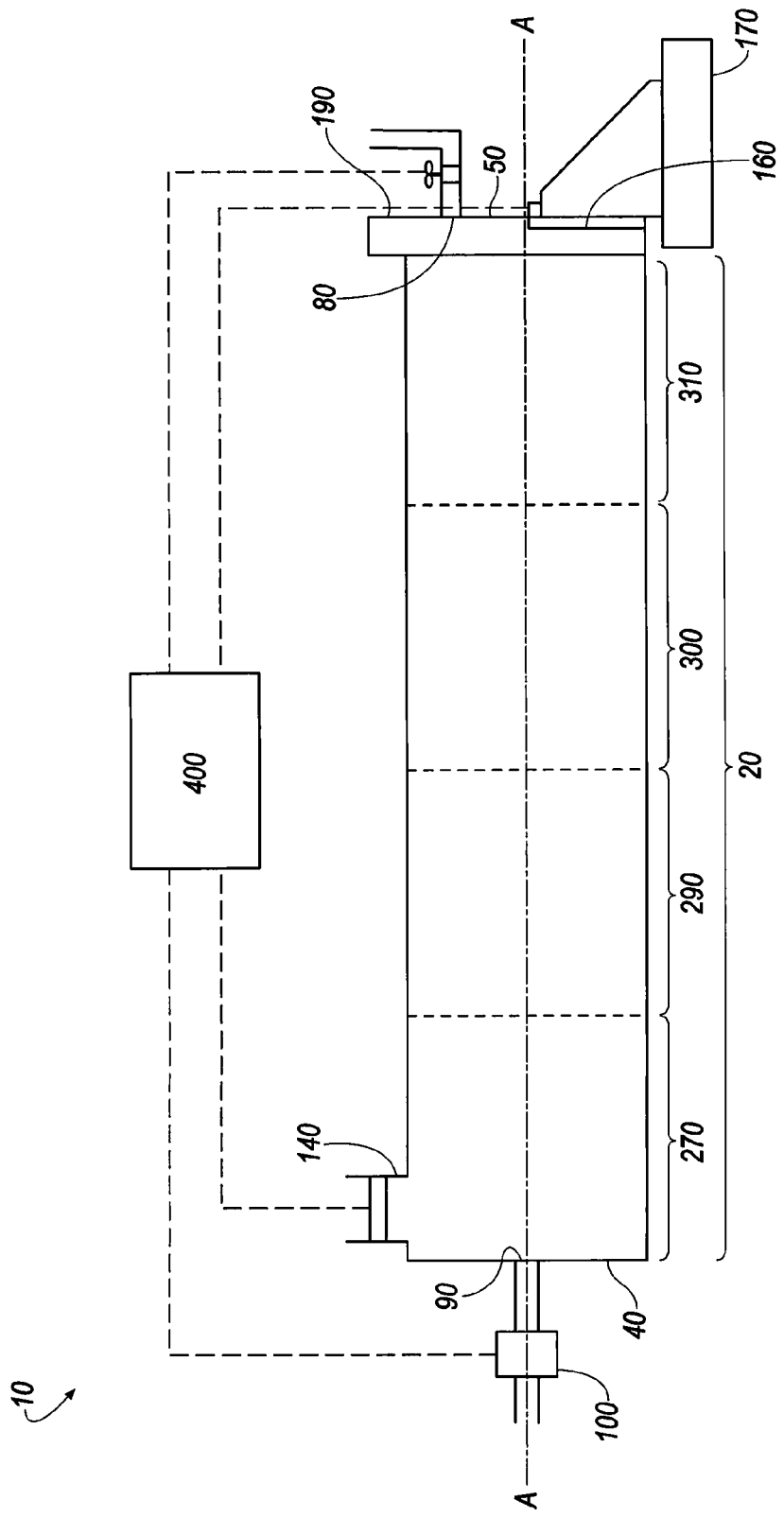
FIG. 1 is a schematic view of an embodiment of a reactor of the present invention.

These figures are by way of example and are not intended to limit the scope of the claimed invention.

DETAILED DESCRIPTION

The present invention provides a method of generating combustible gas from organic feedstock, such as the organic components of municipal waste, and a reactor therefor. The method involves processing feedstock through a plurality of reaction zones within a reactor, wherein the environment of each of the zones facilitates physical or chemical reactions that work to transform the organic feedstock into one or more combustible gases that can be burned for energy production.

I. Definitions

As used herein, the terms "reactor" and "kiln" are used interchangeably to refer to a structure wherein one or more chemical or physical reactions occur.

As used herein, the term "refractory lining" refers to a thermally conductive material that can be disposed on or affixed to an interior surface of a housing, wherein the material of the lining retains its strength at high temperatures. Examples of materials used for refractory linings include non-metallic materials having those chemical and physical properties that make them applicable for structures, or as components of systems, that are exposed to environments above 1,000° F.

As used herein, the phrase "self-sustaining" refers to a process that generates sufficient energy (e.g., heat) to sustain the process indefinitely without the need for significant external energy (e.g., heat) input.

As used herein, the term "rotatable" is a descriptor for any structure that can be rotated. For example, a hollow structure or reactor is rotatable if it can be rotated about any axis.

As used herein, the terms "organic feedstock" and "feedstock" are used interchangeably and refer to any material having an organic component. For example, 'organic feedstock' includes household, commercial, biological, or industrial waste, wherein the waste includes a compound or complex containing carbon. In some examples, feedstock refers to elemental carbon (e.g., coal, graphite, coke, or the like), organic compounds (e.g., polymers (e.g., cellulose, thermoplastics, resins, elastomers, thermosets, proteins, peptides, or the like), pharmaceutical compounds or the like)), or any combination thereof.

As used herein, the term "combustible" refers to any gas or any combination of gases that can combust at furnace temperatures.

As used herein, the terms "synthesis gases" and "syn gas" are used interchangeably to refer to the gas products generated during the thermal decomposition of organic feedstock. For example, syn gas includes one or more gases selected from hydrogen gas, water vapor, carbon monoxide, carbon dioxide, oxygen gas, or any combination thereof.

As used herein, the terms "dehydration" or "dehydrating" refer to the removal of at least some water from a material. In some examples, the removal of water involves a phase transition, wherein water is transformed from a liquid or solid phase to water vapor.

As used herein, the terms "gasification" or "gasifying" refer to the removal of volatile compounds or complexes from a material. In some examples, the removal of volatile compounds or complexes involves a phase transition, wherein the volatile compound or complex is transformed from a liquid or solid phase to one or more gases.

As used herein, the terms "oxidation" or "oxidizing" refer to chemical reduction-oxidation reactions wherein an atomic constituent of a material undergoes an increase in oxidation state. In one example, the reaction of molecular oxygen with carbon involves the oxidation of carbon to generate carbon monoxide or carbon dioxide. In this example, the carbon undergoes an increase in its oxidation state.

As used herein, the term "cooling" refers to the transfer of heat from one material (e.g., a solid, liquid, gas, or any combination thereof) to one or more other materials (e.g., a solid, liquid, gas, or any combination thereof) having a lower temperature.

II. Reactor

Reactors of the present invention generate combustible gas from organic feedstock. In some embodiments, the reactor generates combustible gas from organic feedstock, wherein the organic feedstock comprises one or more organic components of residential waste (e.g., paper, food, plastic, cloth, wood, furniture, any combination thereof, or the like), biological waste (e.g., blood products, animal or human tissue, bandages, instruments (e.g., syringes, tongue depressors, cell cultures, catheters, surgical instruments, any combination thereof, or the like)), commercial waste (plastic, paper, office supplies, building materials, construction materials, any combination thereof, or the like), industrial waste (e.g., storage drums, machine parts, pallets, tools, any combination thereof, or the like), or any combination thereof. In some embodiments, the combustible gas may be further processed (e.g., combusted) to generate heat, steam, electricity, or any combination thereof.

Referring to FIGS. 1-13, the reactor 10 of the present invention comprises a reactor chamber 20 that comprises a housing 30 that encases or encloses the reactor chamber. The reactor chamber further comprises a proximal end 40 and a distal end 50, wherein at least a portion of the interior surface of the housing is substantially circular when viewed in cross-section. A refractory lining 60 is disposed over at least a portion of the interior surface of the housing, wherein the refractory lining comprises one or more lifters 70 extending outward from the surface of the refractory lining. The reactor chamber comprises a gas inlet 80 that is situated at a position on the reactor chamber housing located distal to the proximal end of the reactor chamber, and a gas outlet 90 that is situated at a position on the reactor chamber housing proximal to the distal end of the reactor chamber and the gas inlet. The reactor additionally comprises a pump 100 that fluidly communicates with the gas outlet; a valve 110 that fluidly communicates with the gas inlet, and a rotator 120 that rotates the refractory lining around central axis A.

A. Reactor Chamber

The reactor chamber housing is substantially airtight, so that during reactor operation, the pump and the valve can work cooperatively to regulate or tune the pressure, gas flow 130, or both within the reactor chamber. For example, the pump can increase or decrease the rate at which gas is aspirated from the reactor chamber, the valve can increase or decrease the gas flow into the reactor chamber, or any combination thereof.

In some embodiments, the housing of the reactor chamber further comprises a feedstock inlet 140. In some of these embodiments, the feedstock inlet is located at a position on the housing that is proximal to the gas inlet and the distal end of the reactor chamber. For example, the feedstock inlet is located at approximately the proximal end of the reactor chamber. In some of these embodiments, the feedstock inlet is closeable or sealable. In other embodiments, the feedstock inlet fluidly communicates with a first airlock 150, so that the substantially airtight integrity of the reactor chamber is maintained when feedstock is loaded into the reactor chamber.

In some embodiments, the housing of the reactor chamber further comprises a waste outlet 160. In some of these embodiments, the waste outlet is located at a position on the housing that is distal to the gas outlet and the proximal end of the reactor chamber. For example, the waste outlet is located at approximately the distal end of the reactor chamber. In some of these embodiments, the waste outlet is closeable or sealable. In other embodiments, the waste outlet fluidly communicates with a second airlock 170, so that the substantially airtight integrity of the reactor chamber is maintained when waste materials exit the reactor chamber.

In some embodiments, the housing of the reactor chamber comprises a proximal cap 180 located at the proximal end of the reactor chamber, a distal cap 190 located at the distal end of the reactor chamber, and body 200 interposed between the proximal and distal caps, wherein at least a portion of the interior surface of the body is substantially circular when viewed in cross-section, as illustrated in FIGS. 4A-4D. The refractory lining is disposed (e.g., circumferentially disposed) over at least a portion of the interior surface of the body. In some embodiments, the proximal cap is fixed to the body in such a manner that the refractory lining is free to rotate around the central axis of the reactor chamber while the proximal cap remains substantially in place; the distal cap is fixed to the body in such a manner that the refractory lining is free to rotate around the central axis of the reactor chamber while the distal cap remains substantially in place; or both the proximal and distal caps are fixed to the body in such a manner that the refractory lining is free to rotate around the central axis of the reactor chamber while the caps remains substantially in place and the housing of the reactor chamber is substantially airtight. In alternative embodiments, the proximal cap is fixed to the body in such a manner that the proximal cap rotates in unison with the refractory lining; the distal cap is fixed to the body in such a manner that the distal cap rotates in unison with the refractory lining; or both caps are fixed to the body in such a manner that they rotate in unison with the refractory lining, and the housing of the reactor chamber is substantially airtight.

In some embodiments, the gas outlet is located on the proximal cap. In other embodiments, the gas inlet is located on the distal cap. In some embodiments, the feedstock inlet is located on the proximal cap. And, in some embodiments, the waste outlet is located on the distal cap. In other embodiments, the feedstock inlet, the waste outlet, or both are located on the body of the reactor chamber housing. For example, the feedstock inlet is located on the body of the housing proximal to the distal end of the reactor chamber and the gas inlet. In other examples, the waste outlet is located on the body of the housing distal to the proximal end of the reactor chamber and the gas outlet.

Figure 2:
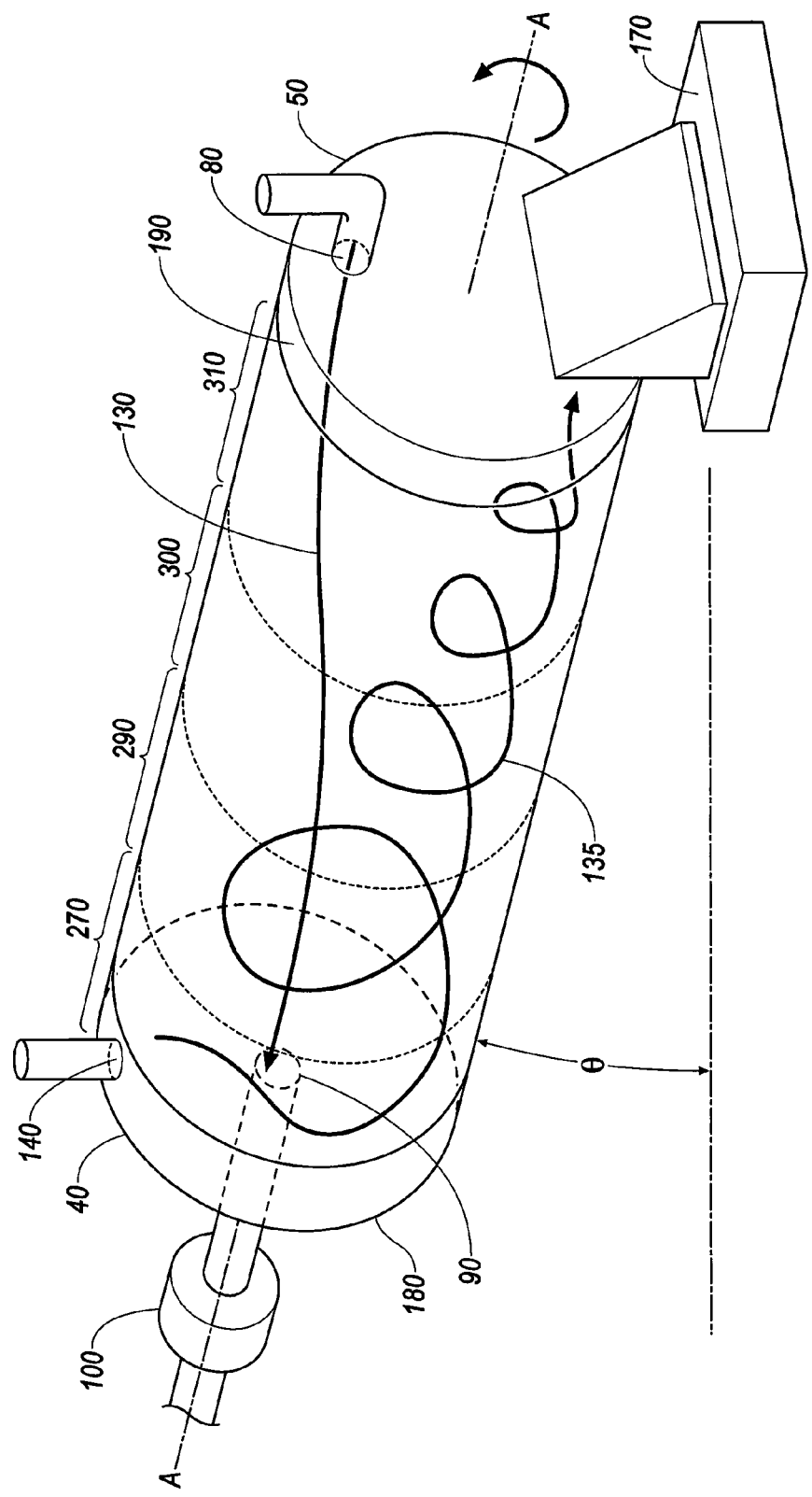
FIG. 2 is a perspective view of an embodiment of a rotatable reactor chamber of the present invention, showing the flow of gas from the distal gas inlet to the proximal gas outlet, and the path of the feedstock from the feedstock inlet to the waste outlet during operation of the reactor.
Figure 3:
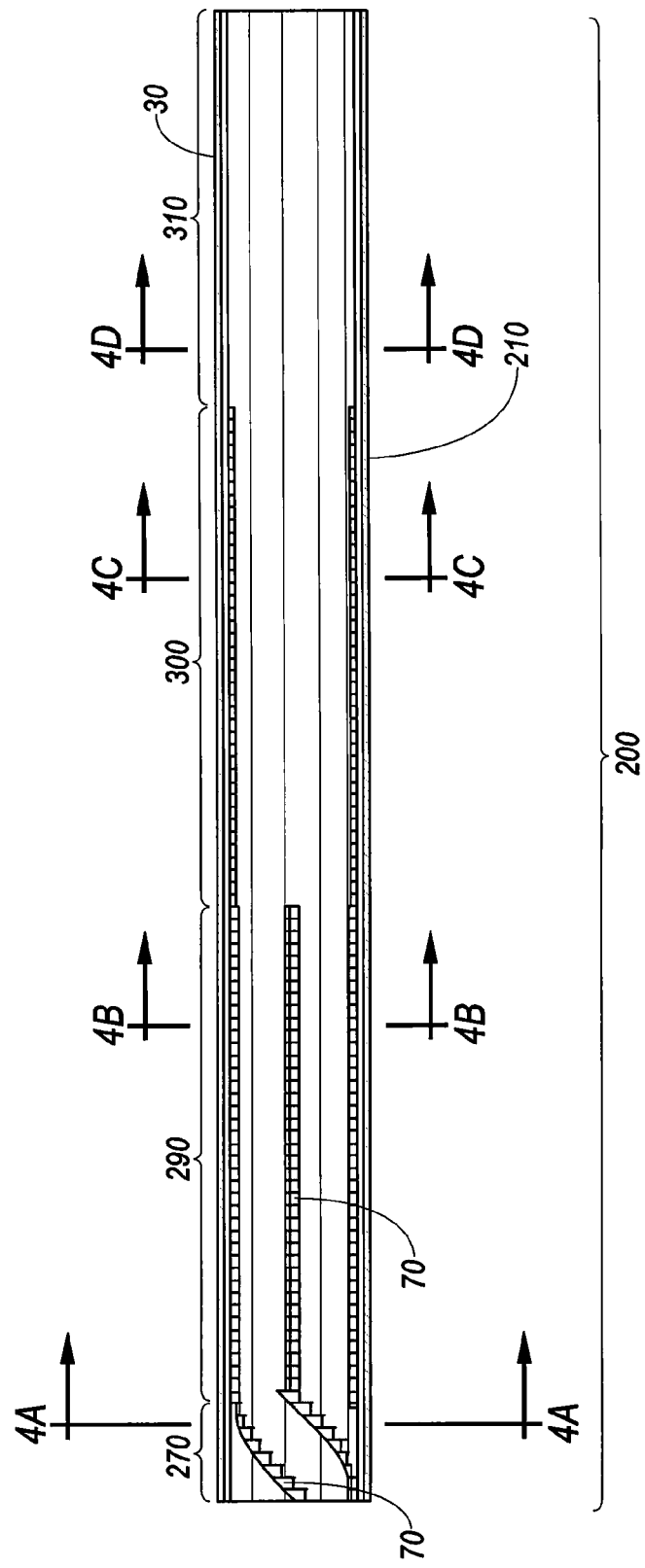
FIG. 3 is a longitudinal sectional view of the interior of an embodiment of a reactor chamber of the present invention.
Figure 8:
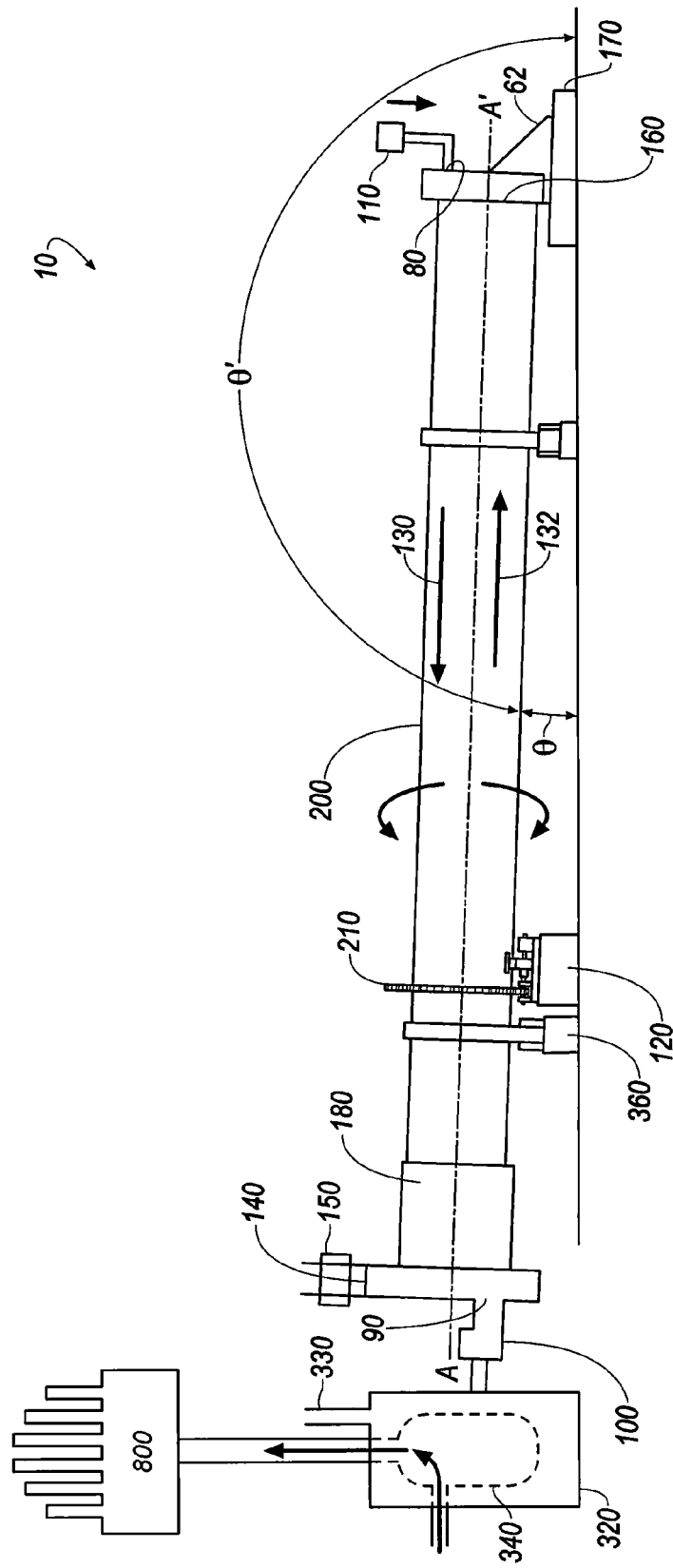
FIG. 8 is a side view of a reactor of the present invention configured to generate heat, steam and/or electricity.
Figure 10:
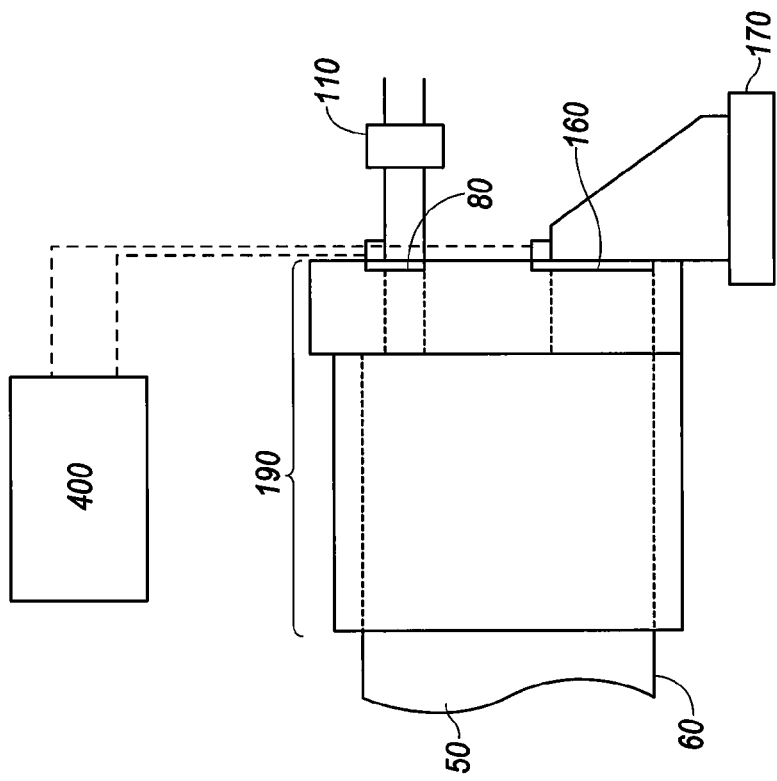
FIG. 10 is a view of the distal end of an embodiment of a reactor chamber.
Figure 9:
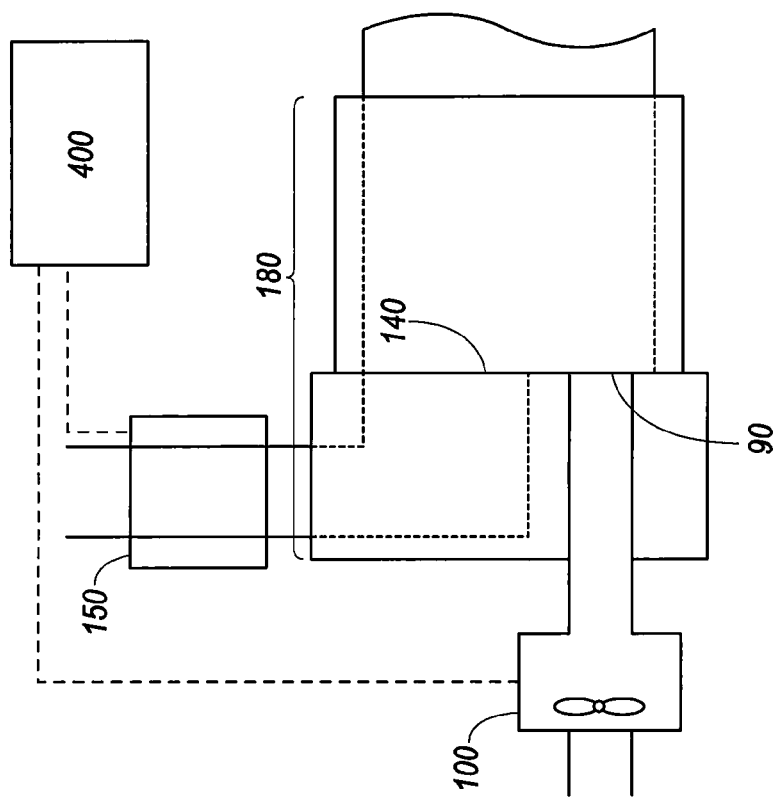
FIG. 9 is a view of the proximal end of an embodiment of a reactor chamber.
Figure 11:
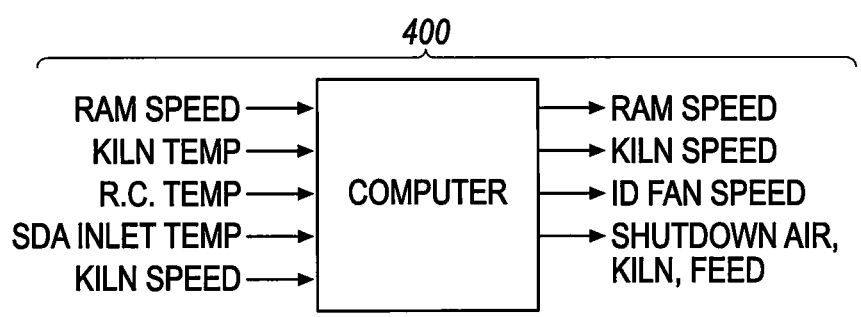
FIG. 11 is a diagram of a controller module of an embodiment of a reactor of the present invention.
Figure 12:
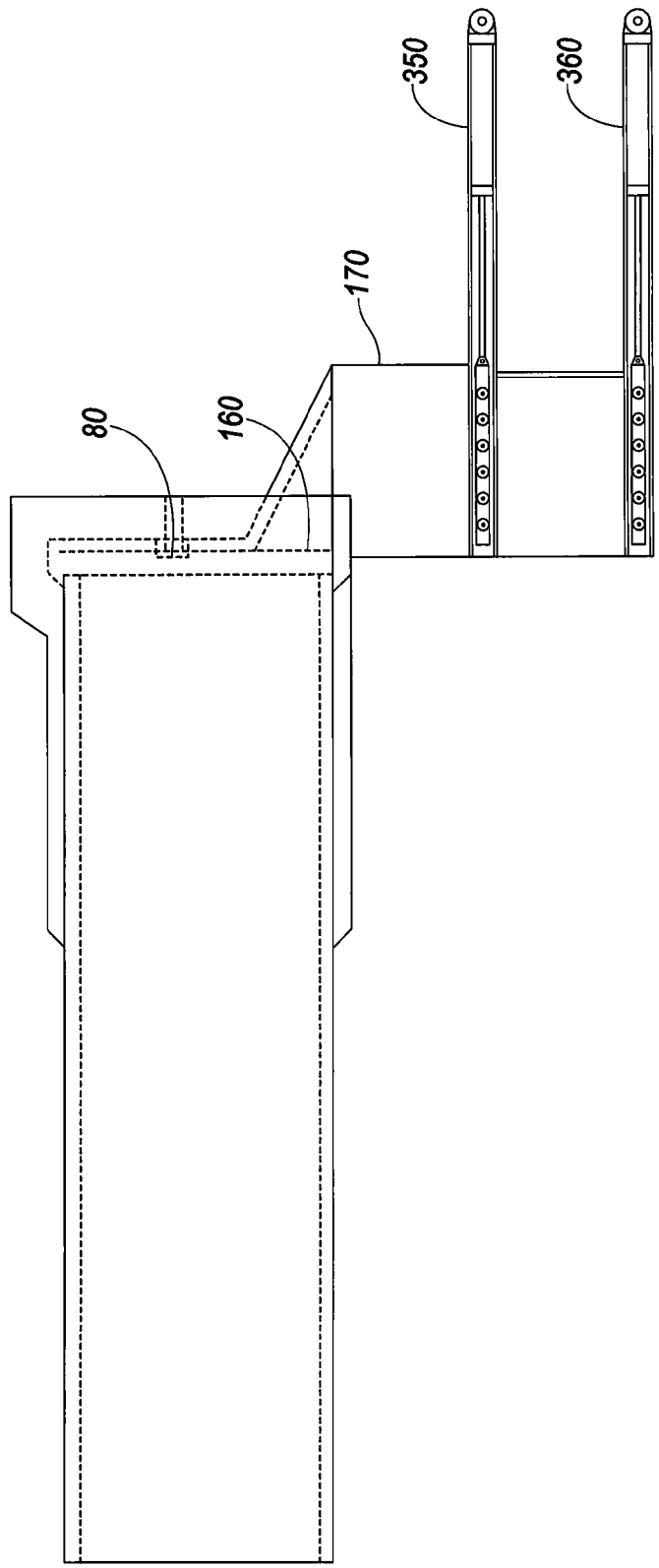
FIG. 12 are views of orientations and placement of optional sorters for waste material in some embodiments of the invention.
Figure 13:
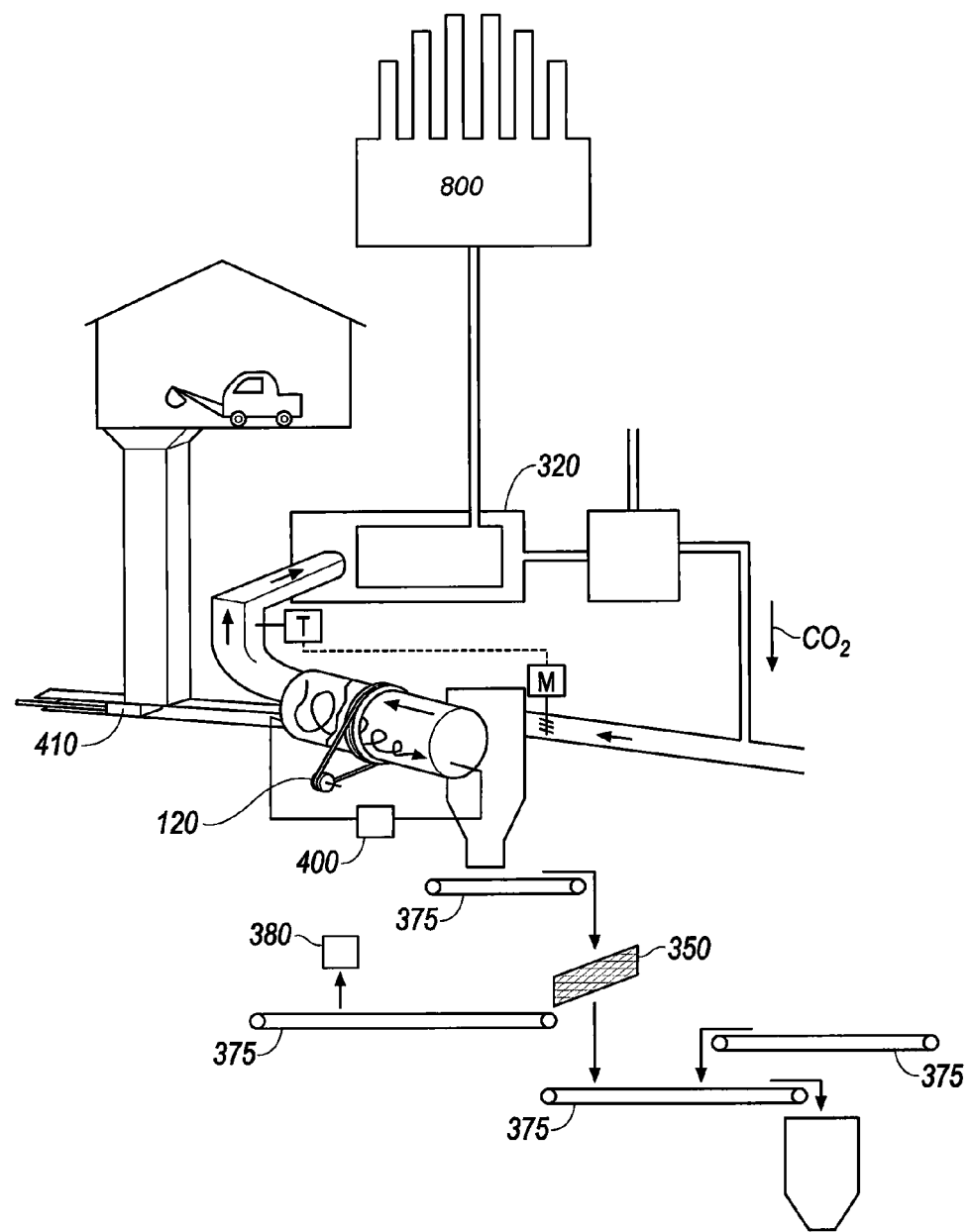
FIG. 13 is a view of optional equipment used to practice one aspect of a method of the present invention.

In some embodiments, the housing of the reactor chamber is substantially cylindrical to give a tube-like structure, as illustrated in FIGS. 1-3. In some embodiments, the housing further comprises an external surface 210, and at least a portion of the external surface rotatably engages the rotator of the reactor, as illustrated in FIG. 8. In other embodiments, the housing comprises an internal surface that engages a surface of the refractory lining. For example, the internal surface of the housing (e.g., the internal surface of the body of the housing) comprises one or more tongues 220 that engages one or more grooves 230 located on a surface of the refractory lining.

The housing of the reactor chamber can comprise any suitable material that can be formed to encase the reactor chamber. In some embodiments, the housing comprises a thermally conducting material that is substantially inert when heated to a temperature of at least 300° F. For example, the housing comprises a metal, metal alloy, or ceramic. In some instances, the housing comprises aluminum, steel, ceramic, or any combination thereof. In other instances, the housing comprises steel.

The rotatable refractory lining is disposed over at least a portion of the interior surface of the reactor chamber. In some embodiments, the refractory lining is disposed over at least a portion of the interior surface of the body of the housing at a location where the cross section of the housing comprises a substantially circular interior surface. For example, the refractory lining is disposed over substantially all of the interior surface of the body having a substantially circular cross section. In other instances, the refractory lining is circumferentially disposed over the substantially all of the interior surface of the body having a cross-section comprising a substantially circular interior surface.

At least a portion of the surface of the refractory lining that is exposed inside the reactor chamber is contoured to facilitate processing of organic feedstock into one or more combustible gases (e.g., syn gas). The contour of the exposed refractory lining includes one or more projections or lifters that extends into the reactor chamber and tumbles any feedstock in the reactor chamber when the refractory lining is rotated around the central axis.

Figure 4A:
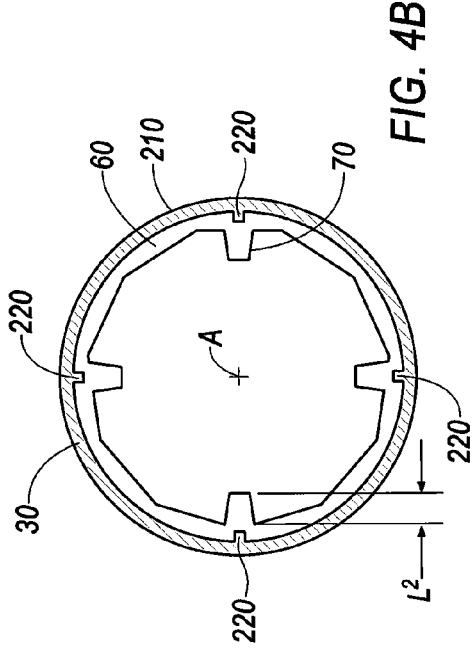
FIGS. 4A-4D are cross sectional views taken of the reactor chamber of FIG. 3.
Figure 4B:
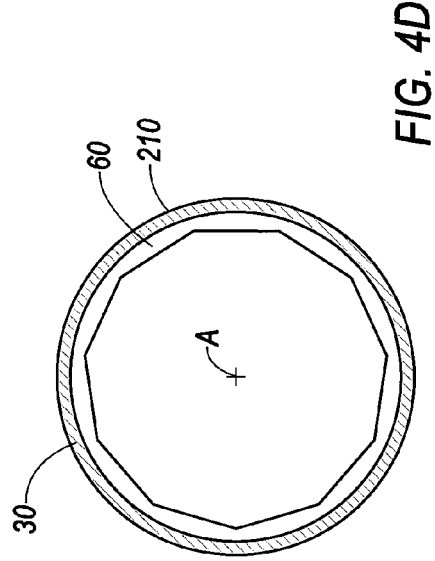
Figure 4C:
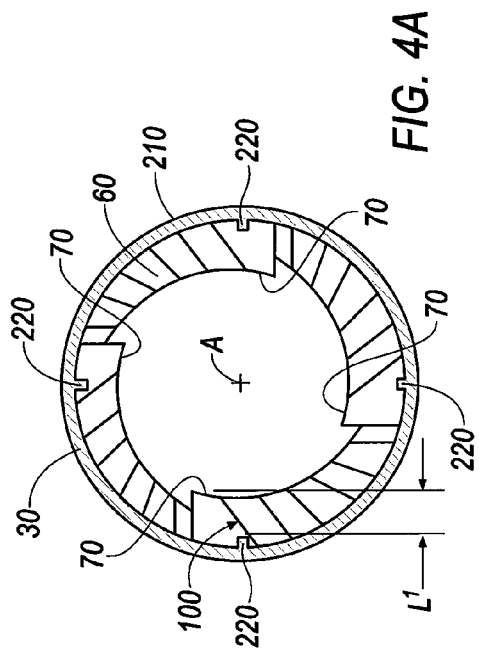

The refractory lining comprises one or more lifters that extend radially into the reaction chamber toward the central axis. For example, the refractory lining comprises a plurality of lifters that extend radially into the reactor chamber toward the central axis. In some embodiments, the plurality of lifters may be evenly spaced around the circumference of the interior surface of the housing, as is illustrated in FIGS. 4C and 4B. In other embodiments, the plurality of lifters may be spirally disposed over a portion of the interior surface of the housing having a substantially circular cross-section, as illustrated in FIG. 4A. And, in some embodiments, as illustrated in FIG. 3, the refractory lining comprises a first plurality of lifters that are spirally disposed over a first portion of the interior surface of the housing body, and a second plurality of lifters that are evenly spaced around the circumference of a second portion of the interior surface of the housing body.

Figure 4D:
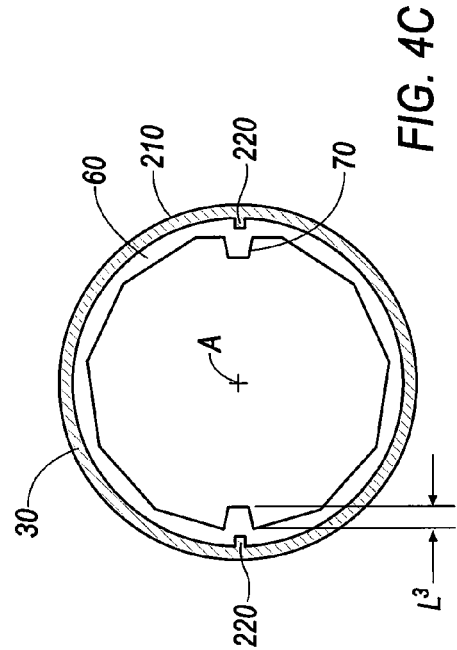
Figure 5:
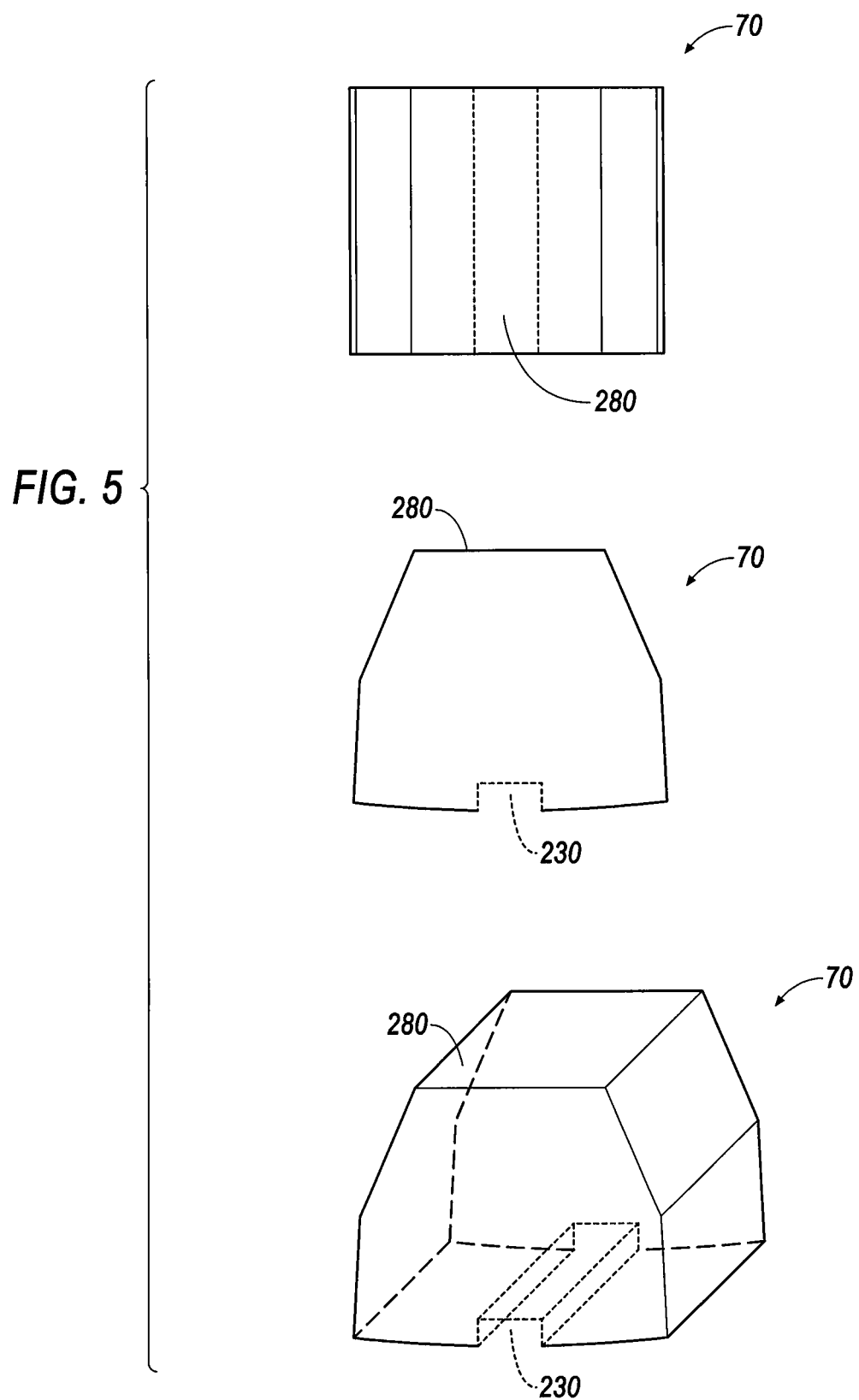
FIG. 5 depicts top, side, and perspective views of an embodiment of a straight lifter.
Figure 6:
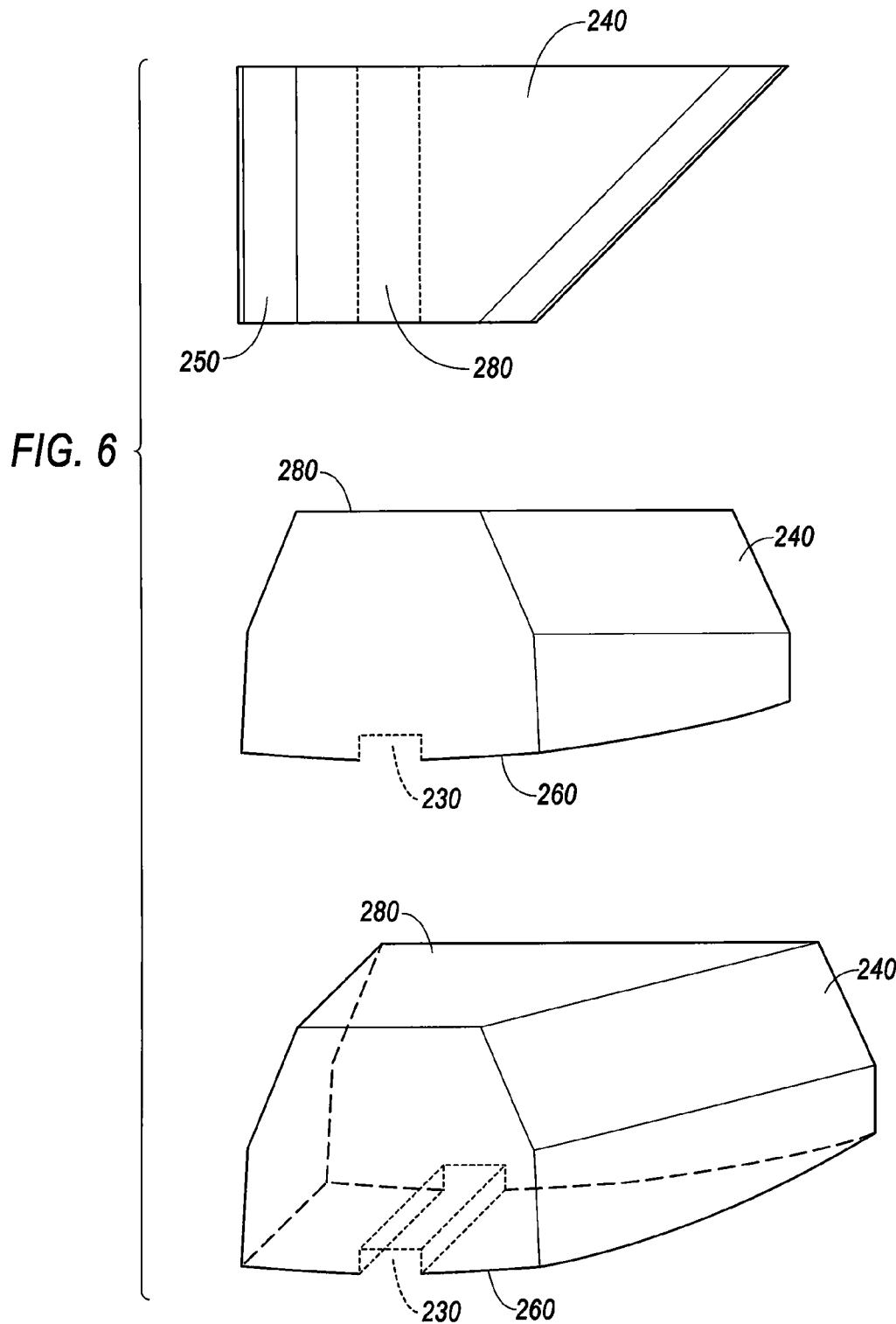
FIG. 6 depicts top, side and perspective views of an embodiment of an angled lifter.

In some embodiments, the refractory lining comprises a first plurality of lifters that are spirally disposed around the circumference of the interior surface of the body located proximal to the distal end of the reaction chamber having a length, $L^1$, measured from the internal surface of the body to the tip of the lifter 280 that extends radially into the reactor chamber toward the central axis. Some of these embodiments further comprise a second plurality of lifters that are evenly disposed around the circumference of the interior surface of the body located distal to the first plurality of lifters having a length, $L^2$, measured from the internal surface of the body to the tip of the lifter that extends radially into the reactor chamber toward the central axis. Some of these embodiments further comprise a third plurality of lifters that are evenly disposed around the circumference of the interior surface of the body located distal to the second plurality of lifters having a length, $L^3$, measured from the internal surface of the body to the tip of the lifter that extends radially into the reactor chamber toward the central axis. In some embodiments, $L^1$ is greater than or equal to $L^2$. In some embodiments, $L^2$ is greater than or equal to $L^3$. And in some embodiments, $L^1 \geq L^2 \geq L^3$. In some of these embodiments, a portion of the refractory lining located distal to the third plurality of lifers is substantially free of lifters giving a cross section comprising a substantially circular internal surface of the refractory lining, as illustrated in FIG. 4D.

Figure 7A:
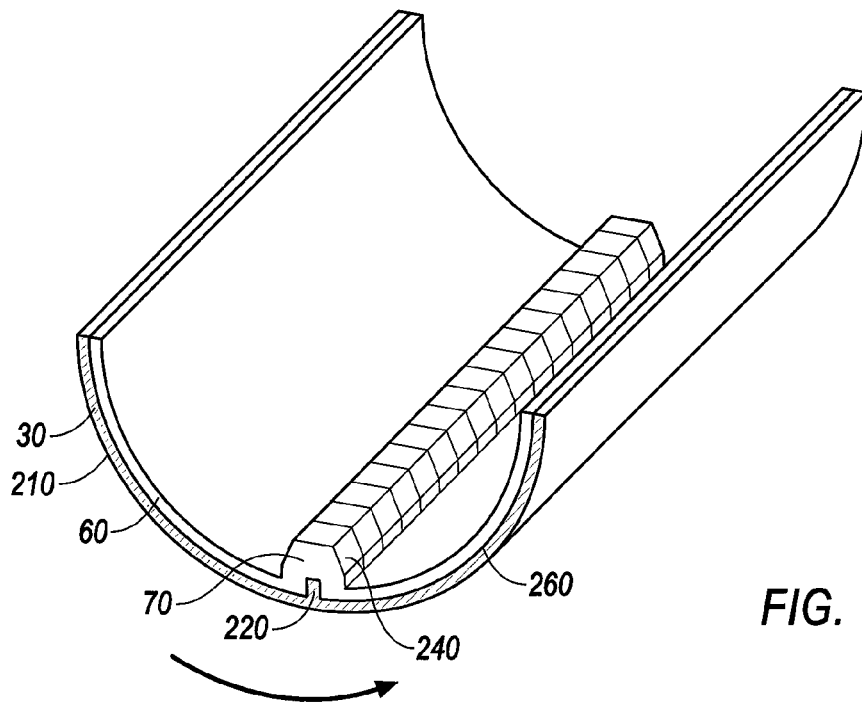
FIG. 7A is an example orientation of straight lifters within the interior of a reactor chamber.
Figure 7B:
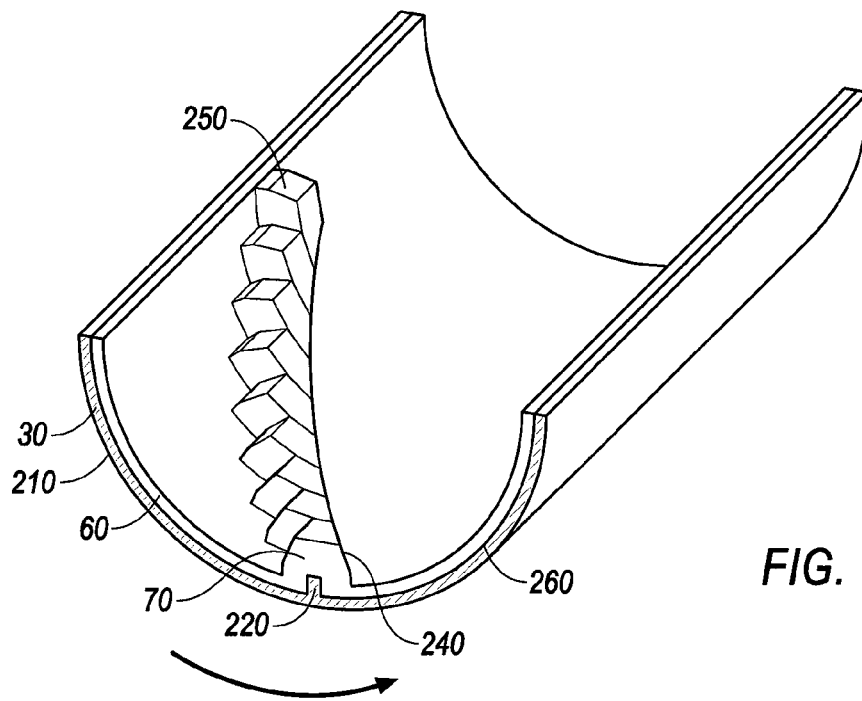
FIG. 7B is a back view of an orientation of angled lifters within the interior of a reactor chamber rotating in a counter-clockwise direction.
Figure 7C:
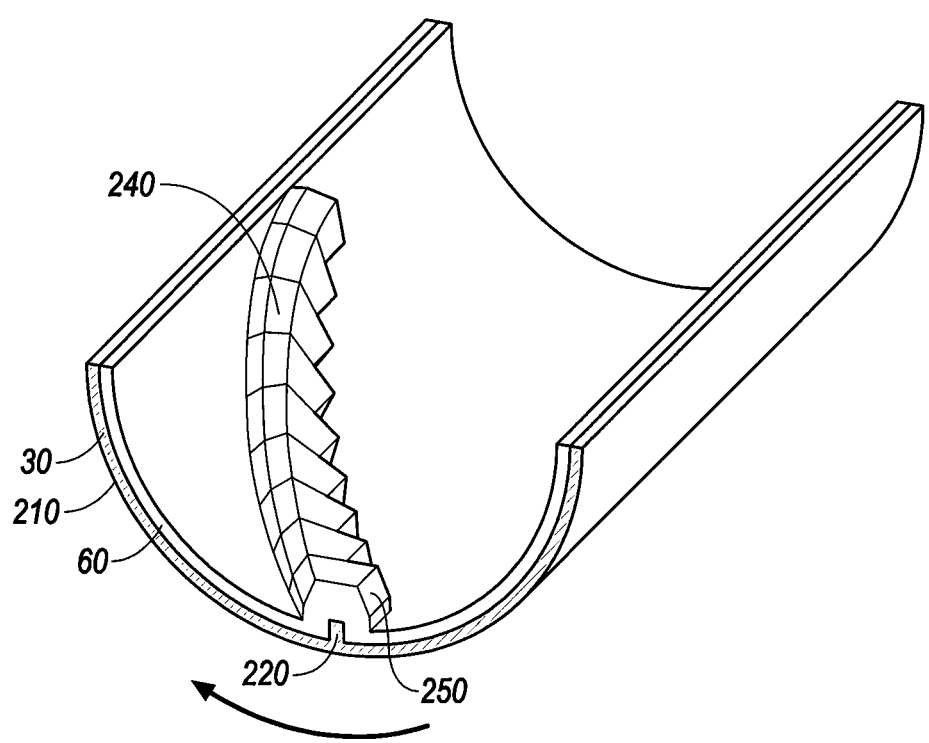
FIG. 7C is a front view of an orientation of angled lifters within the interior of a reactor chamber rotating in a clockwise direction.

Referring to FIGS. 7A-7C, the lifters comprise a leading edge 240 in the direction of rotation and a trailing edge 250 opposite to the direction of rotation. In some embodiments, the leading edge comprises a flat plane having a downward-facing slope. In some embodiments, the leading edge comprises a curved plane having a tangent having a downward-facing slope. In some embodiments, the trailing edge comprises a flat plane having a downward-facing slope. In some embodiments, the trailing edge comprises a curved plane having a tangent having a downward-facing slope.

The refractory lining comprises a concealed surface 260 that contacts at least a portion of the interior surface of the housing of the reactor chamber. In some embodiments, the concealed surface is contoured to engage the interior surface of the housing of the reaction chamber (e.g., the interior surface of the body of the housing) so that the refractory lining may rotate in unison with the housing (e.g., the body of the housing). For example, the concealed surface comprises at least one groove 230 that engages a tongue 220 on the interior surface of the reactor chamber housing (e.g., the interior surface of the body of the housing). In other embodiments, the concealed surface comprises at least one groove that does not substantially engage the interior surface of the housing. For example, the at least one groove is substantially empty. In these examples, the groove may serve as a conduit for a fluid. For instance, the groove comprises a conduit through which a cooling fluid flows. In other instances, the groove comprises a conduit through which a heating fluid flows. And, in some instances, the groove comprises a conduit through which a combustible fuel flows (e.g., petroleum, natural gas, gasoline, diesel fuel, propane, hydrogen gas, syn gas, any combination thereof, or the like).

The refractory lining comprises any suitable thermally conductive material that is substantially inert when subjected to a temperature of at least 2000° F. For example, the lining comprises aluminium oxide (e.g., alumina), silicon dioxide (e.g., or silica), chamotte, or any combination thereof. In some embodiments, the refractory lining comprises a firebrick material. For example, the refractory lining comprises at least one firebrick disposed over a portion of the interior surface of the housing (e.g., the body of the housing). In other examples, the refractory lining comprises a plurality of firebricks that are disposed over the interior surface of the body of the housing. Refractory lining material is commercially available from Allied Mineral Products, Inc. of Columbus, Ohio.

In some embodiments, the feedstock processing within the reactor chamber can be divided into different zones or environments (e.g., a dehydration zone, a gasification zone, an oxidation zone, a cooling or completion zone, or any combination thereof), wherein each zone or environment of the reactor is tailored (e.g., contoured, heated, pressurized, oxygen depleted, oxygen enriched, any combination thereof, or the like) to facilitate a specific chemical and/or physical transformation of the feedstock during its processing into one or more combustible gases (e.g., syn gas). It is noted that a specific chemical and/or physical transformation (e.g., a physical and/or chemical reaction) of feedstock is not restricted to a particular zone or environment in the reaction chamber, but each zone has characteristics suited to enhance a specific chemical and/or physical transformation of the feedstock. In some embodiments, this enhancement includes driving a reaction by improving reaction kinetics. For example, feedstock processing in a dehydration zone of the reactor chamber may undergo additional dehydration within a reactor chamber zone that is not specifically tailored for dehydrating feedstock (e.g., a gasification zone or an oxidation zone).

In some embodiments, the reactor chamber comprises a dehydration zone 270, wherein the dehydration zone is located proximal to the distal end of the reactor chamber. The dehydration zone of the reactor chamber is tailored to remove water, in the form of water vapor, from any wet feedstock.

The dehydration zone of the reactor chamber comprises a portion of the body of the reactor chamber housing that defines a substantially cylindrical volume situated at or near the proximal end of the reactor chamber that is substantially lined with a rotatable refractory lining. In some embodiments, the cylindrical volume has a length of from about 5 feet to about 40 feet. In other embodiments, the cylindrical volume has a diameter of from about 5 feet to about 15 feet. The dehydration zone comprises a tunable negative-pressure, reduced oxygen environment when the reactor is operating. For example, the dehydration zone is tuned to have less than about 5% (e.g., less than about 2.5%, less than 1%, or less than 0.5%) oxygen when the reactor is operating. In some embodiments, the refractory lining in the dehydration zone has a temperature of about 200° F. or greater (e.g., about 210° F. or greater, about 220° F. or greater, or about 250° F. or greater) when the reactor is operating. For example, the refractory lining in the dehydration zone has a temperature of from about 200° F. to about 450° F. during the operation of the reactor.

In other embodiments, the refractory lining of the dehydration zone comprises a first plurality of lifters having a length, $L^1$, measured from the interior surface of the housing to the tip of the lifter 280 that extends radially into the reactor chamber toward the central axis. In some examples, the first plurality of lifters are evenly disposed around the circumference of the interior surface of the housing body. In other examples, the first plurality of lifters is spirally disposed around the circumference of the interior surface of the housing body. In some embodiments, the dehydration zone further comprises the gas outlet, the feedstock inlet, or both. In some embodiments, the dehydration zone comprises a gas flow or gas current that originates at the distal end of the dehydration zone and flows throughout the dehydration zone into the gas outlet. In some of these embodiments, a portion of the gas flowing through the dehydration zone has a temperature of about 500° F. or greater (e.g., about 650° F. or greater, about 750° F. or greater, or about 1200° F. or greater). For instance, a portion of the gas flow has a temperature of from about 500° F. to about 2000° F. In some embodiments, the pressure of the dehydration zone is from about −0.5 inches to about −24 inches, as measured from the top of the dehydration zone in the reaction chamber, when the reactor is operating. This measurement indicates that the gas in the dehydration zone, including the gas flow stemming from the proximal end of the dehydration zone, reaches a maximum elevation of 0.5 to 24 inches from the top of reactor chamber in the dehydration zone.

When the refractory lining of the dehydration zone rotates, feedstock is tumbled or collected by the leading edges of the lifters, lifted to an elevation within the dehydration zone, and dropped from the lifter. This tumbling functions to mix the feedstock to increase the exposure of surfaces within the feedstock to the environment of the dehydration zone, and the tumbling action works to break down the feedstock as falling feedstock collides with the bottom of the dehydration chamber. Furthermore, the lifters elevate feedstock so that the feedstock is briefly exposed to higher temperature gases in the gas flow that are present at higher elevations within the dehydration zone. The length of time in which the feedstock is subjected to the high temperature gases at higher elevations of the oxidation zone can be tuned by increasing or decreasing the rate in which the refractory lining rotates. The exposure of feedstock to the gases can also be tuned by adjusting the aspiration rate of the pump and/or adjusting the gas flow using the valve. In some instances, where the feedstock comprises a high water content, the rate of rotation of the refractory lining can be decreased so that the feedstock spends greater time in the elevated regions of the dehydration zone. In other instances, where the feedstock comprises a low water content, that the rate of rotation of the refractory lining can be increased so that the feedstock spends less time in elevated regions of the oxidation zone. And, the portions of the feedstock contacting the refractory lining are also heated by the hot refractory lining.

Feedstock may be transferred through the dehydration zone into an adjacent zone of the reactor via several mechanisms. In one embodiment, the first plurality of lifters is spirally disposed around the interior surface of the housing body, so that when the refractory lining rotates the leading edges of the lifters, forming a spiraling inclined plane, migrate the feedstock through the dehydration zone and into an adjacent reactor chamber zone distal to the dehydration zone. In another embodiment, the first plurality of lifters are evenly disposed around the circumference of the interior surface of the housing body, and the proximal end of the reactor chamber is elevated with respect to the distal end of the chamber, so that when the refractory lining rotates, the force of gravity migrates the feedstock through the dehydration zone and into an adjacent reactor chamber zone distal to the dehydration zone. And, in some embodiments, the first plurality of lifters are spirally disposed around the interior surface of the housing body, and the proximal end of the reactor chamber is elevated with respect to the distal end of the chamber, so that the inclined plane formed from the leading edges of the spirally disposed lifters and the force of gravity migrate the feedstock through the dehydration zone and into an adjacent reactor chamber zone distal to the dehydration zone.

In some embodiments, the feedstock is processed in the dehydration zone of the reactor and concurrently migrated through the dehydration zone into a gasification zone that is distal to the dehydration zone.

In some embodiments, the reactor chamber comprises a gasification zone 290, wherein the gasification zone is located distal to the dehydration zone and proximal to the distal end of the reactor chamber. The gasification zone or environment of the reactor chamber is tailored to remove volatile compounds, including volatile organic compounds, in the form of gas, from feedstock (e.g., at least partially dehydrated feedstock).

The gasification zone of the reactor chamber comprises a portion of the body of the reactor chamber housing that defines a substantially cylindrical volume lined with a rotatable refractory lining situated proximal to the distal end of the reactor chamber. In some embodiments, the cylindrical volume has a length of from about 5 feet to about 40 feet. In other embodiments, the cylindrical volume has a diameter of from about 5 feet to about 15 feet. The gasification zone comprises a tunable negative-pressure, reduced oxygen environment when the reactor is operating. For example, the gasification zone is tuned to have less than about 10% (e.g., less than about 7%, less than about 3%, or from about 1% to about 7%) of oxygen when the reactor is operating. In some embodiments, the refractory lining in the gasification zone has a temperature of about 450° F. or greater (e.g., about 460° F. or greater, about 500° F. or greater, or about 550° F. or greater). For example, the refractory lining in the gasification zone has a temperature of from about 450° F. to about 690° F. In other embodiments, the refractory lining of the gasification zone comprises a second plurality of lifters having a length, $L^2$, from the interior surface of the reactor chamber housing to the tip of the lifter that extends radially into the reactor chamber toward the central axis. In some examples, the second plurality of lifters are evenly disposed around the circumference of the interior surface of the housing body. In other examples, the second plurality of lifters are spirally disposed around the circumference of the interior surface of the housing body. In other embodiments, the length of the lifters in the gasification zone is less than the length of the lifters in the dehydration zone, i.e., $L^1 > L^2$. In some embodiments, the gasification zone comprises a gas flow or current that originates at the distal end of the gasification zone and flows throughout the gasification zone. In some of these embodiments, a portion of the gas flow has a temperature of about 500° F. or greater (e.g., about 650° F. or greater, about 750° F. or greater, or about 1200° F. or greater). For instance, a portion of the gas flow has a temperature of from about 500° F. to about 2000° F. In some embodiments, the pressure of the gasification zone is from about −0.5 inches to about −24 inches, as measured from the top of the gasification zone in the reactor chamber, when the reactor is operating.

When the refractory lining of the gasification zone rotates, feedstock is collected by the leading edges of the lifters and lifted into the warmer regions of the gas flow, wherein the feedstock is briefly subjected to the heat of the warmer regions of the gas flow before falling from the leading edge to the bottom of the gasification zone of the reactor chamber. Because the length of the lifters in the gasification zone is less than the length of the lifters in the dehydration zone, the tumbling of feedstock in the gasification zone is less rigorous than the tumbling of feedstock in the dehydration zone for a give rate of rotation. The length of time in which the feedstock is subjected to the high temperatures of the gas flow can be tuned by increasing or decreasing the rate in which the refractory lining rotates. In some instances, where the feedstock comprises a volatile compound content, the rate of rotation of the refractory lining can be decreased so that the feedstock spends greater time in the hot regions of the gas flow. In other instances, where the feedstock comprises a low volatile compound content, that the rate of rotation of the refractory lining can be increased so that the feedstock spends less time in the hot regions of the gas flow. And, the portions of the feedstock contacting the refractory lining are also heated by the refractory lining.

Feedstock may be transferred through the gasification zone of the reactor via several mechanisms, as discussed above. In one embodiment, the second plurality of lifters is spirally disposed around the interior surface of the housing body, so that when the refractory lining rotates, the leading edges of the lifters form a spiral inclined plane migrates the feedstock and resulting carbon residue through the gasification zone and into an adjacent reactor chamber zone distal to the gasification zone. In another embodiment, the second plurality of lifters are evenly disposed around the circumference of the interior surface of the housing body, and the proximal end of the reactor chamber is elevated with respect to the distal end of the chamber, so that when the refractory lining rotates, the force of gravity migrates the feedstock through the gasification zone and into an adjacent reactor chamber zone distal to the gasification zone. And, in some embodiments, the second plurality of lifters are spirally disposed around the interior surface of the housing body, and the proximal end of the reactor chamber is elevated with respect to the distal end of the chamber, so that the inclined plane formed from the leading edges of the spirally disposed lifters and the force of gravity migrate the feedstock through the gasification zone and into an adjacent reactor chamber zone distal to the oxidation zone.

In some embodiments, the feedstock is processed into carbon residue (e.g., char) as it migrates through the gasification zone and into an oxidation zone that is distal to the gasification zone and the dehydration zone.

In some embodiments, the reactor chamber comprises an oxidation zone 300, wherein the oxidation zone is located distal to the dehydration zone, distal to the gasification zone, and proximal to the distal end of the reactor chamber. The oxidation zone of the reactor chamber is tailored to oxidize char or carbon containing material, generated during the gasification of the feedstock, to generate oxides of carbon, in the form of gas (e.g., syn gas).

The oxidation zone of the reactor chamber comprises a portion of the body of the reactor chamber housing that defines a substantially cylindrical volume lined with a rotatable refractory lining situated proximal to the distal end of the reactor chamber and distal to the gasification zone. In some embodiments, the cylindrical volume has a length of from about 5 feet to about 40 feet. In other embodiments, the cylindrical volume has a diameter of from about 5 feet to about 15 feet. The oxidation zone comprises a tunable negative-pressure environment having approximately atmospheric levels of oxygen (e.g., about 10% to about 25% by volume) when the reactor is operating. In some embodiments, the refractory lining in the oxidation zone has a temperature of about 700° F. or greater (e.g., about 720° F. or greater, about 750° F. or greater, or about 800° F. or greater). For example, the refractory lining in the oxidation zone has a temperature of from about 700° F. to about 1200° F. In other embodiments, the refractory lining of the oxidation zone comprises a third plurality of lifters having a length, $L^3$, measured from the interior surface of the reactor chamber housing to the tip of the lifter that extends radially into the reactor chamber toward the central axis. In some examples, the third plurality of lifters are evenly disposed around the circumference of the interior surface of the housing body. In other examples, the third plurality of lifters are spirally disposed around the circumference of the interior surface of the housing body. In other embodiments, the length of the lifters in the oxidation zone is less than the length of the lifters in the gasification zone, i.e., $L^2>L^3$. In some embodiments, the oxidation zone comprises a gas flow or current that originates at the distal end of the oxidation zone and flows through the oxidation zone into the gasification zone. In some of these embodiments, a portion of the gas flow entering the oxidation zone has a temperature of about 50° F. or greater (e.g., about 100° F. or greater, about 150° F. or greater, or about 200° F. or greater). For instance, a portion of the gas flow has a temperature of from about 75° F. to about 220° F.

When the refractory lining of the oxidation zone rotates, the carbon residue is collected by the leading edges of the lifters and lifted until it falls from the leading edge to the bottom of the oxidation zone. And, the portions of the carbon material (e.g., char) contacting the refractory lining are also heated by the refractory lining. Because the length of the lifters in the gasification zone is less than the length of the lifters in the dehydration zone, the tumbling of feedstock in the oxidation zone is less rigorous than the tumbling of feedstock in the gasification zone for a given rate of rotation.

Feedstock may be transferred through the oxidation zone of the reactor via several mechanisms. In one embodiment, the third plurality of lifters is spirally disposed around the interior surface of the housing body, so that when the refractory lining rotates, the leading edges of the lifters form a spiral inclined plane migrates the feedstock through the oxidation zone and into an adjacent reactor chamber zone distal to the oxidation zone. In another embodiment, the third plurality of lifters are evenly disposed around the circumference of the interior surface of the housing body, and the proximal end of the reactor chamber is elevated with respect to the distal end of the chamber, so that when the refractory lining rotates, the force of gravity migrates the feedstock through the oxidation zone and into an adjacent reactor chamber zone distal to the oxidation zone. And, in some embodiments, the third plurality of lifters are spirally disposed around the interior surface of the housing body, and the proximal end of the reactor chamber is elevated with respect to the distal end of the chamber, so that the inclined plane formed from the leading edges of the spirally disposed lifters and the force of gravity migrate the feedstock through the gasification zone and into an adjacent reactor chamber zone distal to the oxidation zone.

In some embodiments, the carbon residue is processed into gas oxides of carbon (e.g., carbon monoxide, carbon dioxide, or any combination thereof) in the oxidation zone and any remaining waste or unprocessed carbon residue is concurrently migrated into a cooling zone that is distal to the oxidation zone, the gasification zone, and the dehydration zone.

In some embodiments, the reactor chamber comprises a cooling or completion zone 310, wherein the cooling zone is located distal to the oxidation zone and at or near the distal end of the reactor chamber. The cooling zone of the reactor chamber is tailored to transfer heat from hot waste material or unprocessed feedstock remaining after the feedstock exits the oxidation zone to at least a portion of the refractory lining within the body of the reactor chamber housing.

The cooling zone of the reactor chamber comprises a portion of the body of the reactor chamber housing that defines a substantially cylindrical volume lined with a rotatable refractory lining situated at or near the distal end of the reactor chamber and distal to the oxidation zone. In some embodiments, the cylindrical volume has a length of from about 5 feet to about 40 feet. In other embodiments, the cylindrical volume has a diameter of from about 5 feet to about 15 feet. The cooling zone comprises a tunable negative-pressure environment having atmospheric or slightly less than atmospheric levels of oxygen (e.g., about 10% to about 25% by volume) when the reactor is operating. In some embodiments, the pressure of the gasification zone is from about −0.5 inches to about −24 inches, as measured from the top of the gasification zone in the reactor chamber, when the reactor is operating. In some embodiments, the refractory lining in the cooling zone has a temperature of about 150° F. or greater (e.g., about 200° F. or greater, about 250° F. or greater, or about 300° F. or greater). For example, the refractory lining in the cooling zone has a temperature of from about 250° F. to about 600° F. In other embodiments, the refractory lining of the cooling zone is substantially free of any lifters. In some embodiments, the cooling zone comprises the gas inlet and an optional waste outlet. In some embodiments, the cooling zone comprises a gas flow or current that originates at the gas inlet and flows through the cooling zone into the oxidation zone. In some of these embodiments, the gas flow entering the cooling zone has an ambient temperature.

When the refractory lining of the cooling zone rotates, the hot waste material contacts the surface of the lining and transfers heat to the refractor lining. Likewise, as gas enters the cooling zone from the gas inlet, heat is also transferred from the cooling waste material to the gas.

Waste and unprocessed carbon residue may be transferred through the cooling zone of the reactor by the force of gravity when the proximal end of the reactor chamber is elevated with respect to the distal end of the chamber.

Collectively, the dehydration zone, the gasification zone, the oxidation zone, and cooling zone process organic feedstock (e.g., organic components of municipal waste) into combustible gases such as syn gas in a largely self-sustaining process that is substantially free of energy input once the zones achieve their operating environments.

In some embodiments, ambient air, comprising water vapor, oxygen, nitrogen, and trace gases, flows through the gas inlet and the cooling zone into the oxidation zone. In the oxidation zone, it is theorized that high temperatures facilitate the reaction of oxygen and water vapor in the gas flow with the carbon residue (e.g., char) to generate syn gas comprising hydrogen gas, carbon monoxide, and carbon dioxide according to the following chemical equations:

$$C+H_2O \rightarrow CO+H_2 (\Delta H°298=323.1 \text{ kJ/mol})$$

$$C+O_2 \rightarrow CO_2 (\Delta H°298=-393.5 \text{ kJ/mol})$$

$$CO_2+C \rightarrow 2CO (\Delta H°298=282.1 \text{ kJ/mol})$$

Overall, the reactor chamber can be sized to accommodate a variety of feedstocks and feedstock loading. In some embodiments, the reactor chamber housing has a length of about 300 feet or less. In other embodiments, the reactor chamber housing has a length of greater than about 50 feet (e.g., greater than about 60 feet, greater than about 75 feet, or greater than about 90 feet). For example, the reactor chamber housing has a length of from about 50 feet to about 220 feet (e.g., from about 60 feet to about 150 feet, from about 75 feet to about 140 feet, or from about 100 feet to about 120 feet). In some embodiments, the reactor chamber has an inner diameter of about 20 ft or less. In other embodiments, the reactor chamber has an inner diameter of greater than about 4 feet (e.g., greater than about 5 feet, greater than about 7, or greater than about 8 feet). For example, the inner diameter is from about 5 feet to about 20 feet (e.g., from about 6 feet to about 18 feet, from about 7 feet to about 15 feet, or from about 8 feet to about 12 feet (e.g., about 10 feet)).

It is noted that waste material and partially processed feedstock can be re-processed by the reactor to ensure that the organic components of the waste material or partially processed feedstock are released, in the form of syn gas or the like, from the inorganic components of the waste material. Furthermore, carbon dioxide that is generated by the reactor and by the combustion of gas generated by the reactor can be injected into the reactor's gas flow so that the carbon dioxide can react with water vapor or other gases to form or re-form combustible gases.

It is also noted that feedstock can be sorted before or during its processing through the reactor chamber so that glass, metal, and other inorganic feedstock components are removed from the feedstock.

B. Pump and Valve

Reactors of the present invention comprise a pump that fluidly communicates with the gas outlet that is located at or near the proximal end of the reactor chamber housing. The pump operates to aspirate gas from the reactor chamber.

In some embodiments, the pump is constructed to aspirate gas having a temperature of at least 500° F. (e.g., from 550° F. to about 2000° F.). In one example, the pump comprises a draft fan.

Reactors also comprise a valve that fluidly communicates with the gas inlet that is located at or near the distal end of the reactor chamber housing. The valve controls the flow of gas (e.g., oxygen, nitrogen, hydrogen, combinations thereof (e.g., air), or the like) into the reactor chamber. Valves suited for use in reactors of the present invention are sufficiently closeable so that the substantially airtight integrity of the reactor chamber is maintained. In some embodiments, the valve comprises a ball valve. In other embodiments, the valve comprises a butterfly damper. And, in some embodiments, the valve comprises an actuator that allows the valve to regulate gas flow into the reactor chamber to a changing set point.

During reactor operation, the pump and the valve work cooperatively to regulate, i.e., tune, the flow of gas into the reaction chamber, to regulate the pressure inside the reactor chamber, or both, as described above. The pump and valve may be controlled by processor 400 that communicates with a feedback loop that connects two or more of the gas outlet, the gas inlet, the oxidation zone, the dehydration zone, or the cooling zone.

When the reactor chamber is operating, the pump withdraws gas from the proximal end of the reactor chamber and the gas inlet allows gas (e.g., air, oxygen, nitrogen, hydrogen, or any combination thereof) to enter the reactor chamber at its distal end so that the gas flowing into the reactor chamber travels approximately along the entire length of the reactor chamber. In another example, the pressure inside the reactor chamber is tuned using the pump to increase or decrease the aspiration of gas from the reactor chamber, using the closeable gas inlet to increase or decrease the flow of gas entering the reactor chamber, or any combination thereof.

C. Rotator

The reactor of the present invention comprises a rotator that operates to rotate at least the rotatable refractory lining. In one embodiment, when the refractory lining is fixed to an interior surface of the housing, the rotator engages a portion of the exterior surface of the housing to rotate the housing and the refractory lining in unison. For example, the rotator comprises a loop that engages a portion of the exterior surface of the housing. In some instances the loop comprises a belt or a chain. In other examples, the rotator comprises a drive wheel (e.g., a gear) that engages a portion of the exterior surface of the housing.

In some embodiments, the rotator rotates the reaction chamber at a rate of about 1 rpm or greater (e.g., about 2 rpm or greater, about 3 rpm or greater, or about 4 rpm or greater). For instance, the rotator rotates the reactor chamber at a rate of from about 1 rpm to about 10 rpm (e.g., from about 3 rpm to about 7 rpm, or about 5 rpm).

D. Miscellaneous Apparatuses

Reactors of the present invention may optionally comprise additional features that optimize the operation of the reactor.

In some embodiments, the reactor further comprises a combustion chamber 320 (e.g., a furnace) located outside the reactor chamber. In such embodiments, the combustion chamber fluidly communicates with the pump of the reactor so that the gas or gases generated inside the reactor are aspirated to the combustion chamber to be burned. In other examples, the combustion chamber further comprises an exhaust 330, wherein the gas or gases generated during the combustion process are channeled. In some instances, the exhaust comprises a filter (e.g., activated charcoal or the like), scrubber, filter bag, any combination thereof, or the like. In other instances, the exhaust channels at least some of the exhaust gas (e.g., carbon dioxide) into the distal end of the reaction chamber for recycling through the reactor chamber.

In some embodiments, the reactor further comprises a heat exchanger 340 that thermally communicates with the combustion chamber. In some examples, the heat exchanger comprises a boiler. For instance, the boiler generates steam when water inside the boiler is heated from the combustion of syn gas in the combustion chamber.

In some embodiments, the reactor further comprises an electrical generator. In some examples, the electrical generator comprises a turbine that fluidly communicates with the boiler, so that steam from the boiler rotates the turbine to generate electricity.

In some embodiments, the reactor further comprises a ram that forces feedstock into the proximal end of the reactor chamber.

In some embodiments, the reactor further comprises one or more sorters 350, 360 located at or near the distal end of the reactor chamber that can separate waste material by size, shape, weight, volume, or composition. In alternative embodiments, the sorters are located at or near the proximal end of the reactor chamber. In some examples, the sorter comprises one or more screens that sort waste material by size. In other examples, the sorter comprises one or more magnets that sort waste material by its magnetic properties.

In some embodiments, the reactor further comprises an elevator 360 that can raise or lower the proximal end of the reactor chamber housing so that the reactor chamber housing has an angle θ and an angle θ' with a horizontal axis, as illustrated in FIG. 8. In some instances, the elevator can raise the proximal end of the reactor chamber so that angle θ is greater than 0° (e.g., greater than 1°, greater than 5°, or from about 0.5° to about 80°). When the reactor is operating, the elevator can raise the proximal end of the reactor chamber so that the proximal end has a higher elevation than the distal end, which may assist the transport of feedstock from the proximal end to the distal end of the reactor chamber using the force of gravity. In some embodiments, the elevator lowers the distal end of the reactor chamber, so that the reactor chamber housing has an angle θ and an angle θ' with a horizontal axis, as defined above.

In some embodiments, the reactor comprises a feedback circuit 380 that communicates with one or more of the combustion chamber, dehydration zone, gasification zone, oxidation zone, gas outlet, gas inlet, or cooling zone, wherein the feedback circuit controls one or more of the valve, the pump, the elevator, or the rotator to maintain reactor conditions to ensure optimal conversion of feedstock to combustion gas and/or maintain the self-sustaining character of the conversion process.

III. Methods

Methods of the present invention employ a reactor as described above to process organic feedstock into combustible gas (e.g., syn gas), and the combustible gas can be further processed to generate heat, steam, or electricity.

One method of generating heat from a feedstock comprising organic materials comprises loading the feedstock into a dehydration zone of a rotatable reactor; dehydrating at least a portion of the feedstock comprising concurrently tumbling and heating the feedstock to a temperature of at least about 200° F. in a negative-pressure low-oxygen environment to generate a substantially dehydrated feedstock and water vapor; migrating the dehydrated feedstock into a gasification zone of the reactor; gasifying at least a portion of the dehydrated feedstock comprising concurrently tumbling and heating the dehydrated feedstock to a temperature above about 350° F. (e.g., above about 400° F., above about 450° F., above about 500° F., or from about 350° F. to about 650° F.) in a negative-pressure low-oxygen environment to generate one or more gases and a mixture comprising a carbon residue (e.g., char) and a waste material; migrating the carbon residue and the waste material into an oxidation zone of the reactor; oxidizing at least a portion of the carbon residue comprising reacting the carbon residue with oxygen gas at a temperature above about 675° F. in a negative-pressure environment comprising from about 12% to about 25% oxygen by volume to generate one or more gases; migrating the waste material into a cooling zone of the reactor, wherein heat from the waste material is transferred to the reactor; aspirating the one or more gases and water vapor generated during the dehydration, gasification, or oxidation steps into a combustion chamber.

In some implementations, combustible gas is combusted inside the combustion chamber to generate heat. In other implementations, the combustion chamber is located outside the reactor chamber.

In some implementations, the tumbling and heating of the dehydrating step comprises rotating an internal surface of the dehydration zone substantially circumferentially about a central longitudinal axis that extends throughout the dehydration zone, wherein the internal surface comprises a heated refractory lining that is disposed over at least a portion of the interior surface of the dehydration zone and the refractory lining comprises one or more first lifters that tumbles the feedstock when the reactor is rotated. For example, the tumbling and heating of the dehydrating step comprises rotating the internal surface of the dehydration zone at a rate of from about 1 rpm to about 10 rpm (e.g., about 5 rpm).

In some implementations, the tumbling and heating of the gasifying step comprises rotating an internal surface of the gasification zone substantially circumferentially about a central longitudinal axis that extends throughout the gasification zone, wherein the internal surface comprises a heated refractory lining that is disposed over at least a portion of the interior surface of the gasification zone and the refractory lining comprises one or more first lifters, one or more second lifters, or a combination of thereof, that tumbles the feedstock when the reactor is rotated. For example, the tumbling and heating of the gasifying step comprises rotating the internal surface of the gasification zone at a rate of from about 1 rpm to about 10 rpm.

In some implementations, the tumbling and heating of the oxidation step comprises rotating an internal surface of the oxidation zone substantially circumferentially about a central longitudinal axis that extends throughout the oxidation zone, wherein the internal surface comprises a heated refractory lining that is disposed over at least a portion of the interior surface of the oxidation zone and the refractory lining comprises one or more second lifters, one or more third lifters, or a combination of thereof, that tumbles the feedstock when the reactor is rotated. For example, the tumbling and heating of the oxidizing step comprises rotating the internal surface of the oxidation zone at a rate of from about 1 rpm to about 10 rpm.

In other implementations, the low-oxygen environment of the dehydration zone comprises less than about 5% oxygen by volume.

In alternative implementations, the low-oxygen environment of the gasification zone comprises less than about 7% oxygen by volume.

In some implementations, the aspiration of the combustible gas is accomplished by a pump that fluidly communicates with the dehydration zone of the reactor. For example, a draft fan fluidly communicating with the dehydration zone aspirates the combustible gas.

Some implementations further comprise generating a current of gas that travels inside the reactor from the cooling zone to the dehydration zone, wherein the current of gas is generated by a pump that fluidly communicates with the dehydration zone of the reactor and generates negative pressure inside the reactor. For example, the pump operates cooperatively with a valve that fluidly communicates with a gas inlet disposed on the cooling zone of the reactor to control the flow of the current of gas and to control the pressure inside the reactor.

And, in some implementations, the feedstock comprises household waste, commercial waste, or any combination thereof.

Some implementations further comprise removing material from the feedstock that comprises metals, glass, materials having a high water content, or any combination thereof. This sorting process can be performed before or during the processing of the feedstock in the reactor.

Some implementations further comprise expelling the waste material from the cooling zone of the reactor through a waste outlet that fluidly communicates with the cooling zone.

In some implementations, the waste outlet fluidly communicates with an airlock.

In some implementations, the feedstock is loaded into the dehydration zone of the reactor through a feedstock inlet in the dehydration zone. And, in some implementations, the feedstock inlet fluidly communicates with an airlock.

And, in alternative implementations, the method further comprises pre-heating one or more of the dehydration zone, the gasification zone, the oxidation zone, or the cooling zone so that to a temperature of refractory lining in the zone or zones is greater than 400° F. before feedstock is processed in the reactor.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A reactor for generating combustible gas from organic waste comprising:
    a reactor chamber comprising:
        a housing comprising:
            a proximal end and a distal end, wherein at least a portion of an interior surface of the housing is substantially circular when viewed in cross-section, and
            a central axis extending from the proximal end to the distal end;
        a refractory lining disposed over at least a portion of the interior surface of the housing, the refractory lining comprising lifters extending outward from the interior surface of the housing in a spiral arrangement with respect to the center axis, the lifters comprising:
            a first group of lifters having a first length and situated on a distal portion of the interior surface of the housing;
            a second group of lifters having a second length and situated on the interior surface of the housing distally of the first group of lifters, the second length less than the first length; and
            a third group of lifters having a third length and situated on the interior surface of the housing distally of the second plurality of lifters, the third length less than the second length;
        a gas inlet that fluidly communicates with a portion of the housing distal from the proximal end of the housing;
        a gas outlet that fluidly communicates with a portion of the housing proximal from the distal end of the housing and the gas inlet;
    a pump that fluidly communicates with the gas outlet;
    a valve that fluidly communicates with the gas inlet;
    a rotator that rotates the housing around the central axis;
    a combustion chamber comprising a furnace that fluidly communicates with the pump and the gas outlet, wherein the furnace includes an exhaust port, wherein the pump is arranged downstream of the gas outlet and upstream of the furnace; and
    a boiler arranged within the furnace, the boiler generating steam when water disposed inside the boiler is heated from combustion of syn gas in the combustion chamber.

2. The reactor of claim 1, wherein the housing is rotatable around the central axis.

3. The reactor of claim 1, further comprising an elevator that can reversibly elevate the proximal end of the housing so that the central axis of the housing can form angles, θ and θ' with a horizontal axis.

4. The reactor of claim 3, wherein the smaller of angles θ and θ' is 80° or less.

5. The reactor of claim 1, wherein the housing comprises a thermally conductive material.

6. The reactor of claim 1, wherein the refractory lining comprises a thermally conductive material.

7. The reactor of claim 6, wherein the refractory lining comprises ceramic or a fire brick material.

8. The reactor of claim 1, further comprising a turbine that fluidly communicates with the boiler so that steam from the boiler rotates the turbine to generate electricity.

9. The reactor of claim 1, wherein the housing comprises a length of about 300 feet or less.

10. The reactor of claim 9, wherein the inner surface of the housing comprises a diameter of about 20 feet or less.

11. The reactor of claim 1, wherein the exhaust port of the combustion chamber comprises a filter.

12. The reactor of claim 11, wherein the filter includes one or more of an activated charcoal filter, and scrubber.

13. A reactor for generating combustible gas from organic feedstock comprising:
    a rotatable reactor chamber having proximal and distal ends and defining a center axis, the reactor chamber comprising:
        a dehydration zone disposed proximate the distal end of the reaction chamber, the dehydration zone comprising a gas outlet, a feedstock inlet, and a first refractory lining disposed over at least a portion of an interior surface of the dehydration zone, the first refractory lining comprising a first group of lifters extending from the interior surface of the dehydration zone and having a first length;
        a gasification zone disposed distally of the dehydration zone, the gasification zone comprising a second refractory lining disposed over at least a portion of an interior surface of the gasification zone, the second refractory lining comprising a second group of lifters having a second length less than the first length;
        an oxidation zone disposed distally of the gasification zone, the oxidation zone comprising a third refractory lining disposed over a portion of an interior surface of the oxidation zone, the third refractory lining comprising a third group of lifters having a third length less than the second length; and
        a cooling zone disposed distally of the oxidation zone, the cooling zone comprising a gas inlet that fluidly communicates with a valve;
        wherein the lifters are arranged in a spiral arrangement with respect to the center axis;
    a pump that fluidly communicates with the gas outlet, wherein the dehydration zone fluidly communicates with the gasification zone, the gasification zone fluidly communicates with the oxidation zone, and the oxidation zone fluidly communicates with the cooling zone, wherein the rotatable reactor chamber is substantially airtight when the gas outlet, the feedstock inlet, and gas inlet are closed, wherein the pump and the valve cooperatively operate to regulate the pressure or gas flow inside the reactor chamber;

a combustion chamber comprising a furnace that fluidly communicates with the pump and the gas outlet, wherein the furnace includes an exhaust port, wherein the pump is arranged downstream of the gas outlet and upstream of the furnace; and a boiler arranged within the furnace, the boiler generating steam when water disposed inside the boiler is heated from combustion of syn gas in the combustion chamber.

14. The reactor of claim 13, wherein the cooling zone comprises a fourth refractory lining disposed over at least a portion of interior surface of the cooling zone.

15. The reactor of claim 14, further comprising a first airlock that fluidly communicates with the feedstock inlet on the dehydration zone.

16. The reactor of claim 15, further comprising a second airlock that fluidly communicates with the waste outlet of the cooling zone.

17. The reactor of claim 14, wherein the cooling zone further comprises a waste outlet.

18. The reactor of claim 14, wherein the pump operates to generate negative pressure inside the reactor chamber when the valve is at least partially closed.

19. The reactor of claim 18, further comprising a furnace that fluidly communicates with the pump.

20. The reactor of claim 13, further comprising a turbine that fluidly communicates with the boiler so that steam from the boiler rotates the turbine to generate electricity.

* * * * *